(12) United States Patent
Sharma et al.

(10) Patent No.: US 12,022,194 B2
(45) Date of Patent: Jun. 25, 2024

(54) CAMERA WITH IMAGE SENSOR SHIFTING

(71) Applicant: Apple Inc., Cupertino, CA (US)

(72) Inventors: Shashank Sharma, San Francisco, CA (US); Scott W. Miller, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/353,805

(22) Filed: Jul. 17, 2023

(65) Prior Publication Data

US 2023/0362489 A1  Nov. 9, 2023

Related U.S. Application Data

(63) Continuation of application No. 17/566,463, filed on Dec. 30, 2021, now Pat. No. 11,750,929, which is a
(Continued)

(51) Int. Cl.
*H04N 23/68* (2023.01)
*G02B 7/08* (2021.01)
(Continued)

(52) U.S. Cl.
CPC ............ *H04N 23/687* (2023.01); *G02B 7/08* (2013.01); *G02B 27/646* (2013.01); *G03B 3/10* (2013.01);
(Continued)

(58) Field of Classification Search
CPC ...... H04N 23/687; H04N 23/54; H04N 23/55; H04N 23/57; H04N 23/6815; H04N 23/6812; G02B 7/08; G02B 27/646; G03B 3/10; G03B 5/00; G03B 2205/0007; G03B 2205/0069; G03B 5/02; G03B 2205/0015; H02K 41/0354; H02K 2201/18; H02K 41/0356
See application file for complete search history.

(56) References Cited

U.S. PATENT DOCUMENTS 7,170,690 B2   1/2007  Ophey
7,612,953 B2  11/2009  Nagai et al.
(Continued)

FOREIGN PATENT DOCUMENTS

CN   1940628   4/2007
CN  101808191   8/2010
(Continued)

OTHER PUBLICATIONS

U.S. Appl. No. 18/461,367, filed Sep. 5, 2023, Mahmoudzadeh, et al.
(Continued)

*Primary Examiner* — Yogesh K Aggarwal
(74) *Attorney, Agent, or Firm* — Robert C. Kowert; Kowert, Hood, Munyon, Rankin & Goetzel, P.C.

(57) ABSTRACT

Various embodiments include a camera voice coil motor (VCM) actuator configured to shift an image sensor along multiple axes. Some embodiments include a magnet and coil arrangement. Some embodiments include a position sensing arrangement. Some embodiments include a flexure arrangement. Some embodiments include a coil structure and coil carrier assembly.

20 Claims, 19 Drawing Sheets

Related U.S. Application Data continuation of application No. 17/112,411, filed on Dec. 4, 2020, now Pat. No. 11,223,766, which is a continuation of application No. 16/036,838, filed on Jul. 16, 2018, now Pat. No. 10,863,094.

(60) Provisional application No. 62/533,611, filed on Jul. 17, 2017.

(51) Int. Cl.
    *G02B 27/64*     (2006.01)
    *G03B 3/10*     (2021.01)
    *G03B 5/00*     (2021.01)
    *H02K 41/035*     (2006.01)
    *H04N 23/54*     (2023.01)
    *H04N 23/55*     (2023.01)
    *H04N 23/57*     (2023.01)

(52) U.S. Cl.
    CPC ........... *G03B 5/00* (2013.01); *H02K 41/0354* (2013.01); *H04N 23/54* (2023.01); *H04N 23/55* (2023.01); *H04N 23/57* (2023.01); *H04N 23/6815* (2023.01); *G03B 2205/0007* (2013.01); *G03B 2205/0069* (2013.01); *H02K 2201/18* (2013.01); *H04N 23/6812* (2023.01)

(56) References Cited

U.S. PATENT DOCUMENTS

| | | | |
|---|---|---|---|
| 7,630,618 | B2 | 12/2009 | Nomura |
| 7,952,612 | B2 | 5/2011 | Kakkori |
| RE42,642 | E | 8/2011 | Sato et al. |
| 8,111,295 | B2 | 2/2012 | Makimoto et al. |
| 8,248,497 | B2 | 8/2012 | Tanimura et al. |
| 8,264,549 | B2 | 9/2012 | Tokiwa et al. |
| 8,488,260 | B2 | 7/2013 | Calvet et al. |
| 8,548,313 | B2 | 10/2013 | Krueger |
| 8,749,643 | B2 | 6/2014 | Lim et al. |
| 8,817,393 | B2 | 8/2014 | Kwon |
| 8,866,918 | B2 | 10/2014 | Gregory et al. |
| 8,908,086 | B2 | 12/2014 | Kawai |
| 8,947,544 | B2 | 2/2015 | Kawai |
| 8,998,514 | B2 | 4/2015 | Gutierrez et al. |
| 9,298,017 | B2 | 3/2016 | Sugawara et al. |
| 9,316,810 | B2 | 4/2016 | Mercado |
| 9,578,217 | B2 | 2/2017 | Gutierrez et al. |
| 9,632,280 | B2 | 4/2017 | Yeo |
| 9,736,345 | B1 | 8/2017 | Topliss et al. |
| 9,773,169 | B1 | 9/2017 | Fulmer |
| 9,807,305 | B2 | 10/2017 | Guitierrez |
| 10,257,433 | B2 | 4/2019 | Eromaki |
| 10,863,094 | B2 | 12/2020 | Sharma et al. |
| 10,890,734 | B1 | 1/2021 | Sharma et al. |
| 10,924,675 | B2 | 2/2021 | Hubert et al. |
| 11,122,205 | B1 | 9/2021 | Sharma et al. |
| 11,163,141 | B2 | 11/2021 | Yao et al. |
| 11,223,766 | B2 | 1/2022 | Sharma et al. |
| 11,575,835 | B2 | 2/2023 | Xu et al. |
| 11,582,388 | B2 | 2/2023 | Hubert et al. |
| 11,604,337 | B2 | 3/2023 | Yao et al. |
| 11,635,597 | B2 | 4/2023 | Ya et al. |
| 11,750,929 | B2 | 9/2023 | Sharma et al. |
| 2001/0001588 | A1 | 5/2001 | Matz et al. |
| 2003/0160902 | A1 | 8/2003 | Mihara |
| 2003/0184878 | A1 | 10/2003 | Tsuzuki |
| 2004/0105025 | A1 | 6/2004 | Scherling |
| 2004/0257677 | A1 | 12/2004 | Matsusaka |
| 2006/0017815 | A1 | 1/2006 | Stavely et al. |
| 2007/0024739 | A1 | 2/2007 | Konno |
| 2007/0070525 | A1 | 3/2007 | Taniyama |
| 2007/0279497 | A1 | 12/2007 | Wada et al. |
| 2009/0147340 | A1 | 6/2009 | Lipton |
| 2009/0179995 | A1 | 7/2009 | Fukumoto |
| 2009/0295986 | A1 | 12/2009 | Topliss et al. |
| 2009/0296238 | A1 | 12/2009 | Kakuta |
| 2010/0165131 | A1 | 7/2010 | Makimoto et al. |
| 2010/0315521 | A1 | 12/2010 | Kunishige |
| 2011/0141294 | A1 | 6/2011 | Lam |
| 2011/0141339 | A1 | 6/2011 | Seo |
| 2011/0235194 | A1 | 9/2011 | Nobe |
| 2012/0106936 | A1 | 5/2012 | Lim et al. |
| 2012/0120512 | A1 | 5/2012 | Wade et al. |
| 2012/0224075 | A1 | 9/2012 | Lim |
| 2012/0268642 | A1 | 10/2012 | Kawai |
| 2013/0107068 | A1 | 5/2013 | Kim et al. |
| 2013/0119785 | A1 | 5/2013 | Han |
| 2013/0250169 | A1 | 9/2013 | Kim et al. |
| 2014/0009631 | A1 | 1/2014 | Topliss |
| 2014/0111650 | A1 | 4/2014 | Georgiev |
| 2014/0139695 | A1 | 5/2014 | Kawai |
| 2014/0255016 | A1 | 9/2014 | Kim et al. |
| 2014/0327965 | A1 | 11/2014 | Chen |
| 2015/0042870 | A1 | 2/2015 | Chan et al. |
| 2015/0051097 | A1 | 2/2015 | Anderton et al. |
| 2015/0135703 | A1 | 5/2015 | Eddington |
| 2015/0195439 | A1 | 7/2015 | Miller et al. |
| 2015/0253543 | A1 | 9/2015 | Mercado |
| 2015/0253647 | A1 | 9/2015 | Mercado |
| 2015/0316748 | A1 | 11/2015 | Cheo et al. |
| 2015/0350499 | A1 | 12/2015 | Topliss |
| 2015/0358528 | A1 | 12/2015 | Brodie et al. |
| 2016/0041363 | A1 | 2/2016 | Hagiwara |
| 2016/0070115 | A1 | 3/2016 | Miller et al. |
| 2016/0072998 | A1 | 3/2016 | Yazawa |
| 2016/0073028 | A1 | 3/2016 | Gleason et al. |
| 2016/0097937 | A1 | 4/2016 | Lam |
| 2016/0154204 | A1 | 6/2016 | Lim et al. |
| 2016/0154252 | A1 | 6/2016 | Miller |
| 2016/0161828 | A1 | 6/2016 | Lee |
| 2016/0209672 | A1 | 7/2016 | Park et al. |
| 2016/0327773 | A1 | 11/2016 | Choi et al. |
| 2016/0360111 | A1 | 12/2016 | Thivent et al. |
| 2017/0023781 | A1 | 1/2017 | Wang |
| 2017/0054883 | A1 | 2/2017 | Sharma et al. |
| 2017/0082829 | A1 | 3/2017 | Kudo et al. |
| 2017/0108670 | A1 | 4/2017 | Ko |
| 2017/0155816 | A1 | 6/2017 | Ito et al. |
| 2017/0219842 | A1* | 8/2017 | Howarth .............. G02B 27/646 |
| 2017/0285362 | A1 | 10/2017 | Hu et al. |
| 2017/0324906 | A1 | 11/2017 | Kang et al. |
| 2017/0351158 | A1 | 12/2017 | Kudo |
| 2017/0357076 | A1 | 12/2017 | Scheele |
| 2018/0024329 | A1* | 1/2018 | Goldenberg ........... H04N 23/45 |
| 2018/0041668 | A1 | 2/2018 | Cui |
| 2018/0048793 | A1 | 2/2018 | Gross et al. |
| 2018/0173080 | A1 | 6/2018 | Enta |
| 2018/0217475 | A1* | 8/2018 | Goldenberg ............. G03B 3/10 |
| 2019/0014258 | A1 | 1/2019 | Horesh |
| 2019/0041661 | A1 | 2/2019 | Murakami |
| 2020/0314338 | A1 | 10/2020 | Johnson |
| 2021/0132327 | A1 | 5/2021 | Sharma et al. |
| 2021/0223563 | A1 | 7/2021 | Miller |
| 2021/0409604 | A1 | 12/2021 | Sharma et al. |
| 2022/0124249 | A1 | 4/2022 | Sharma et al. |
| 2022/0247931 | A1 | 8/2022 | Mahmoudzadeh et al. |
| 2023/0188852 | A1 | 6/2023 | Xu et al. |
| 2023/0199313 | A1 | 6/2023 | Mahmoudzadeh et al. |

FOREIGN PATENT DOCUMENTS

| | | |
|---|---|---|
| CN | 102135656 | 7/2011 |
| CN | 102749697 | 10/2012 |
| CN | 103117637 | 5/2013 |
| CN | 104767915 | 7/2015 |
| CN | 104898352 | 9/2015 |
| CN | 10502204 | 11/2015 |
| CN | 105025657 | 11/2015 |
| CN | 204903924 | 12/2015 |
| CN | 105573014 | 5/2016 |
| CN | 105652557 | 6/2016 |
| CN | 105807537 | 7/2016 |
| CN | 106291862 | 1/2017 |
| CN | 106470303 | 3/2017 |

(56) References Cited

FOREIGN PATENT DOCUMENTS

| | | |
|---|---|---|
| CN | 207573455 | 7/2018 |
| CN | 109155816 | 1/2019 |
| CN | 111567029 | 8/2020 |
| JP | H10285475 | 10/1998 |
| JP | 2006078854 | 3/2006 |
| JP | 2008203402 | 9/2008 |
| JP | 2011154403 | 8/2011 |
| JP | 2011203476 | 10/2011 |
| JP | 2013072967 | 4/2013 |
| JP | 2013125080 | 6/2013 |
| JP | 2015146040 | 8/2015 |
| JP | 2016028299 | 2/2016 |
| KR | 20100048361 | 5/2010 |
| KR | 20150051097 | 5/2015 |
| KR | 20160000759 | 1/2016 |
| TW | 201114249 | 4/2011 |
| TW | 201418863 | 5/2014 |
| TW | I438543 | 5/2014 |
| WO | 2016011801 | 1/2016 |
| WO | 2020069391 | 4/2020 |

OTHER PUBLICATIONS

International Search Report and Written Opinion from PCT/US2018/042440, dated Sep. 26, 2018, Apple Inc., pp. 1-12.
Extended European Search Report from Application No. 21192835.3-1208, dated Nov. 11, 2021, pp. 1-29.
Warren J. Smith, "Modern Lens Design," In: Modern Lens Design, Jan. 1, 1992, McGraw-Hill, Inc., XP055152035, ISBN: 978-0-07-059178-3, pp. 25-27.

* cited by examiner

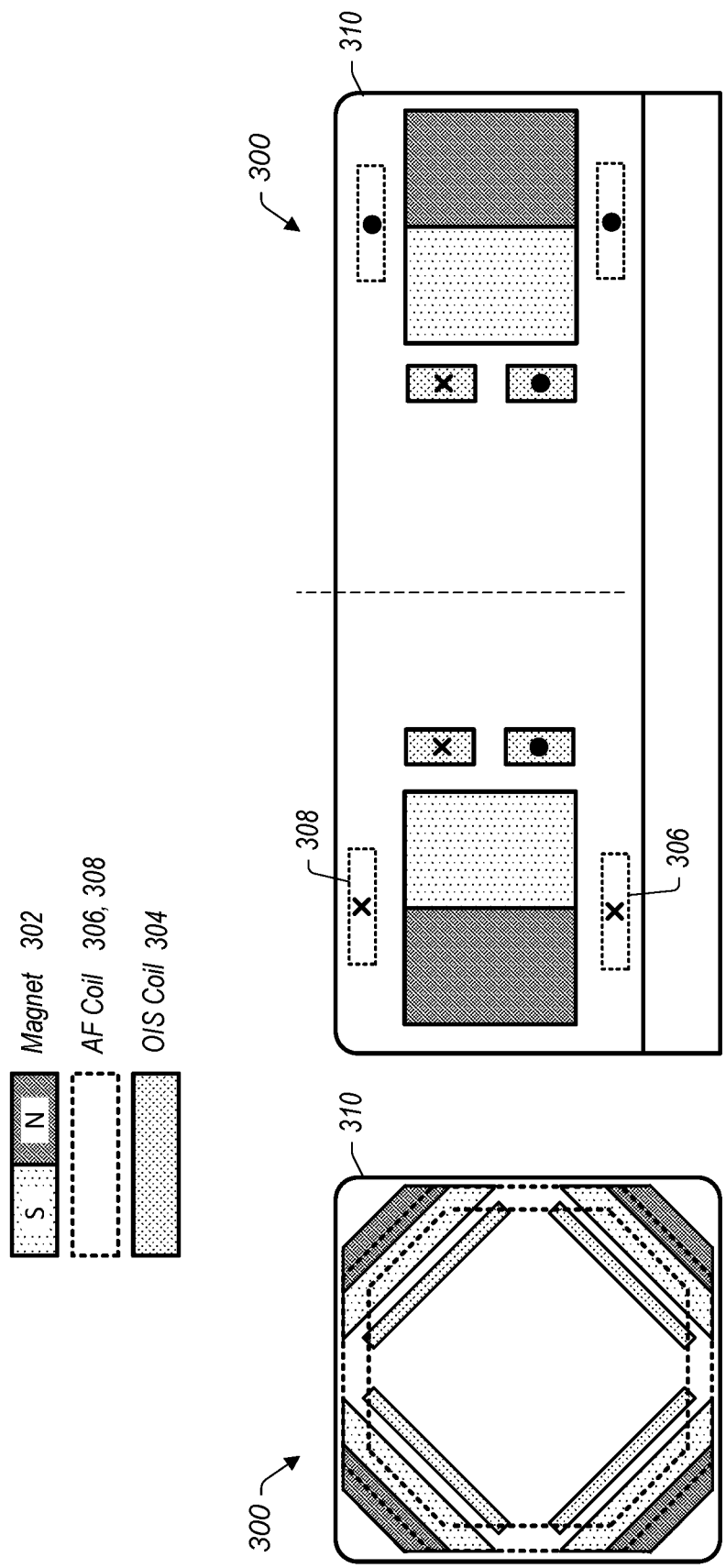

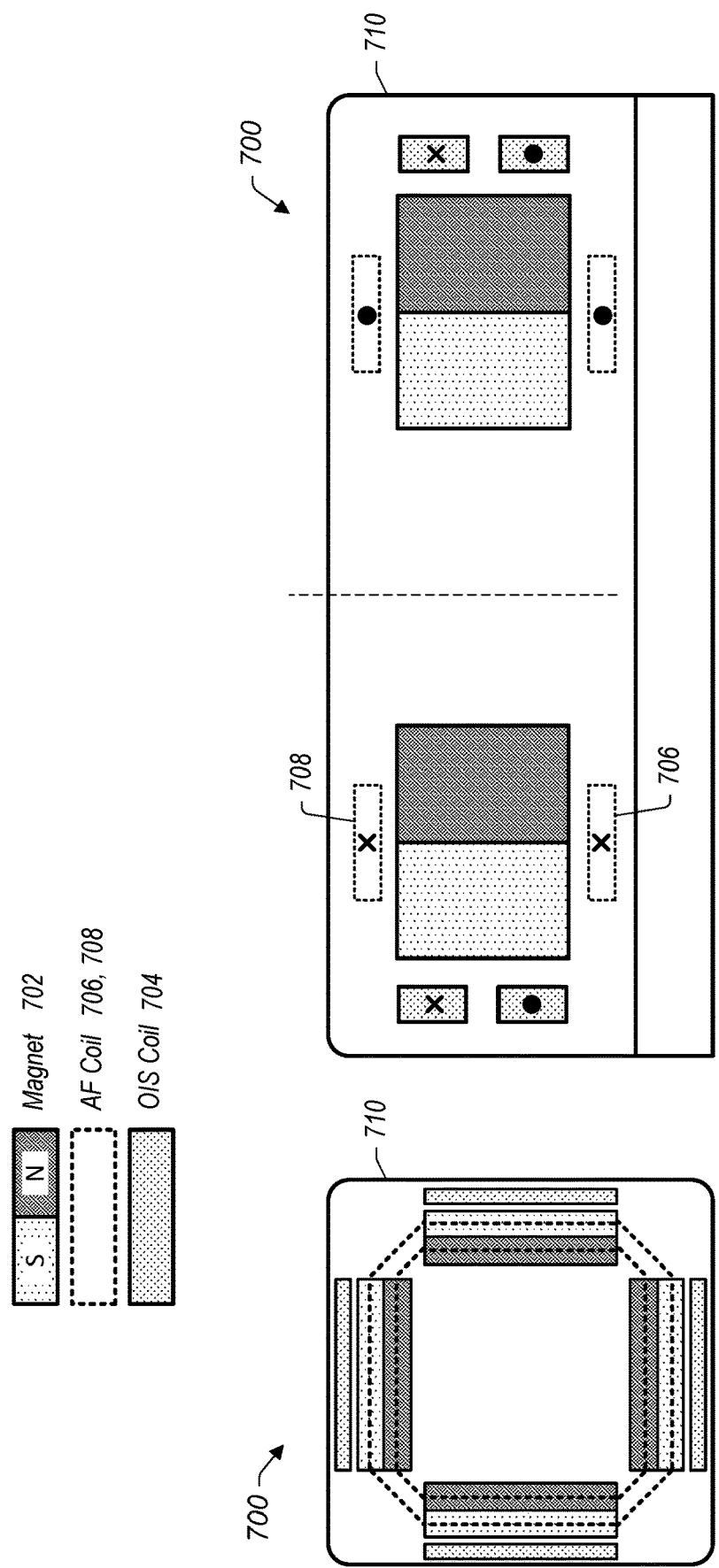

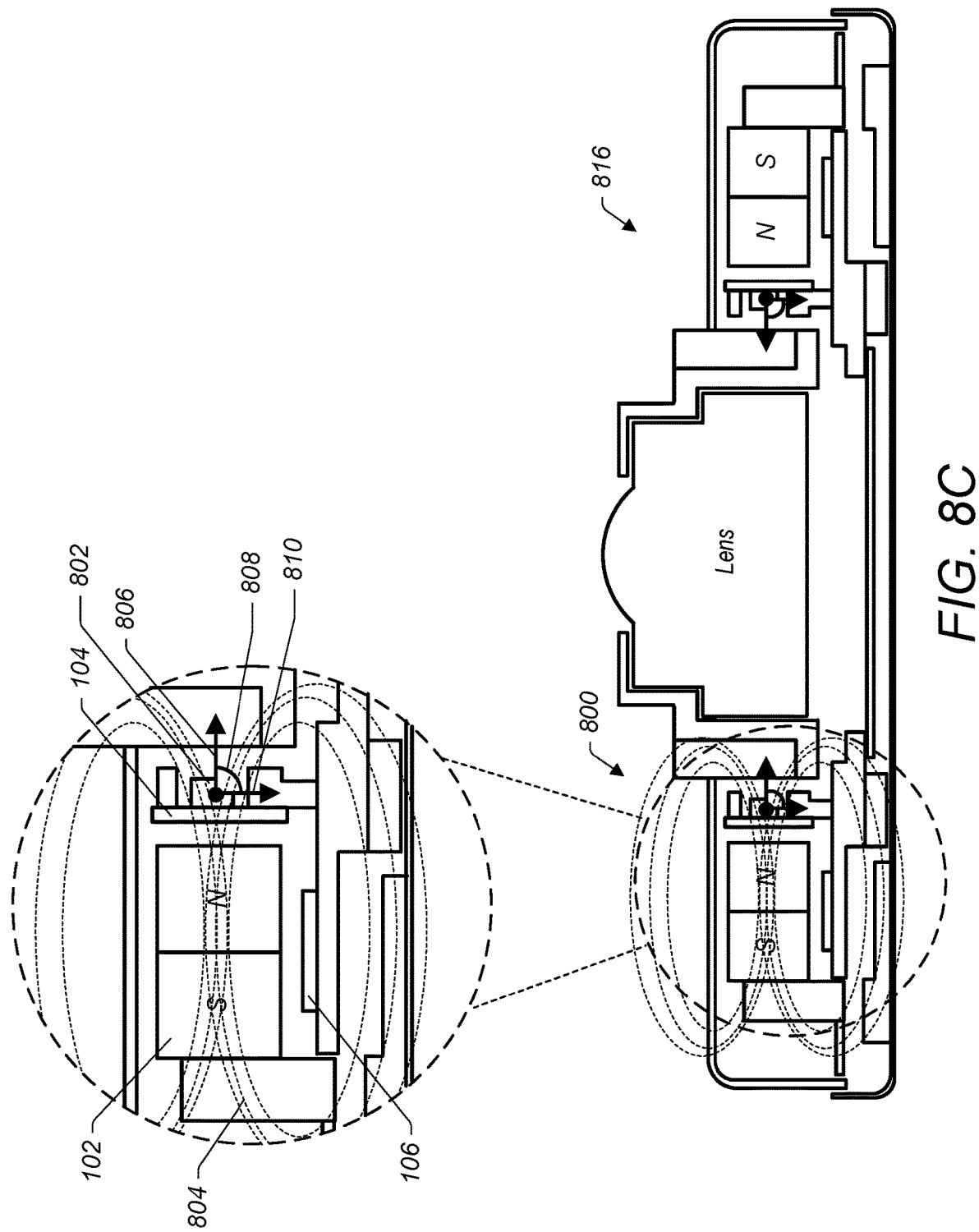

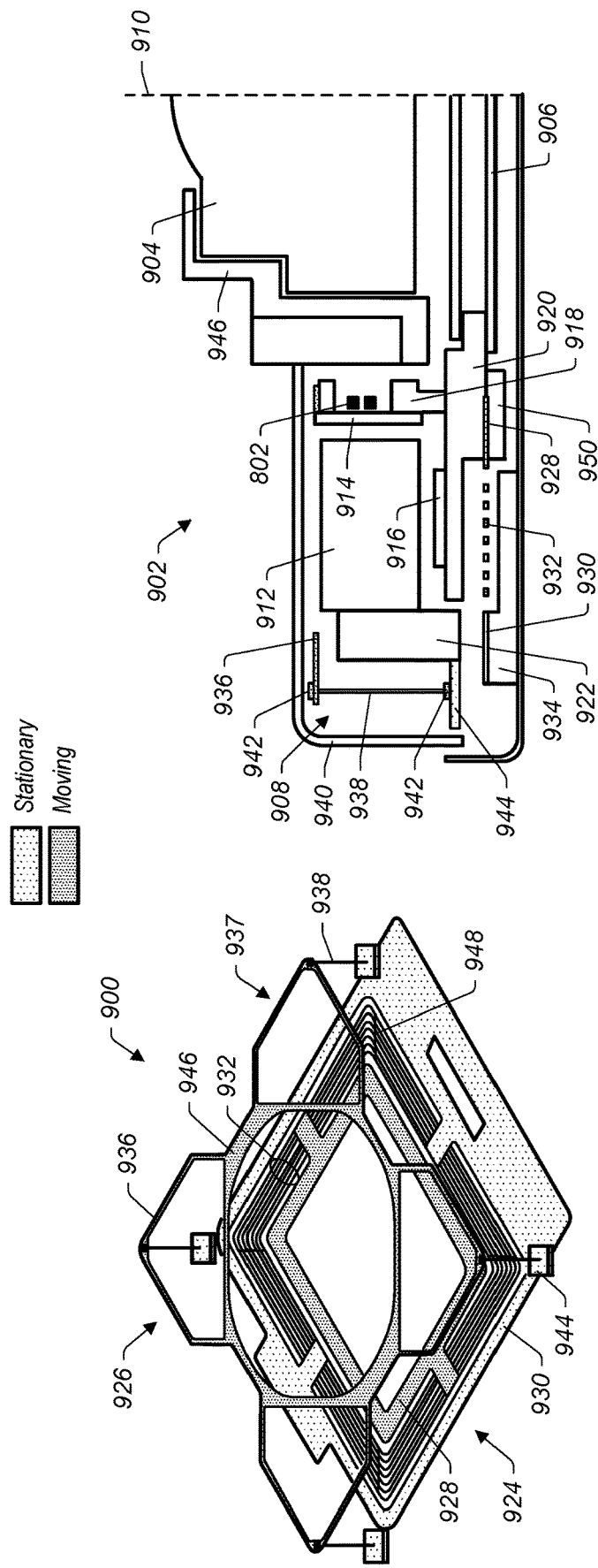

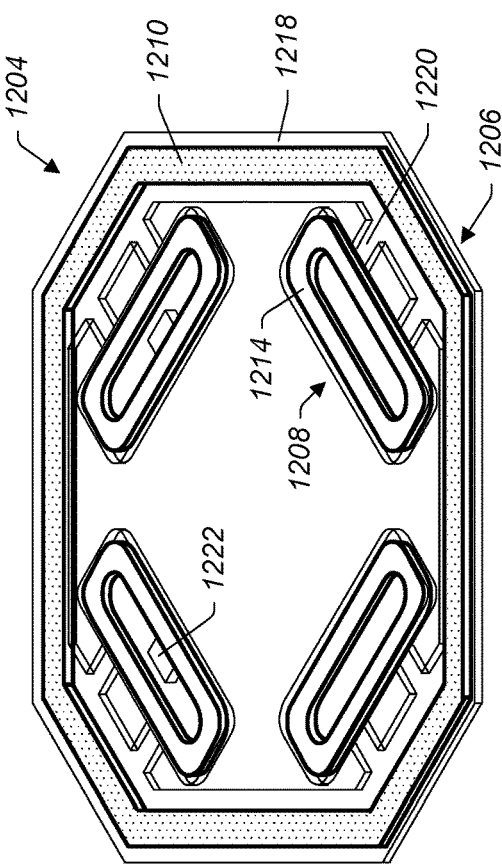
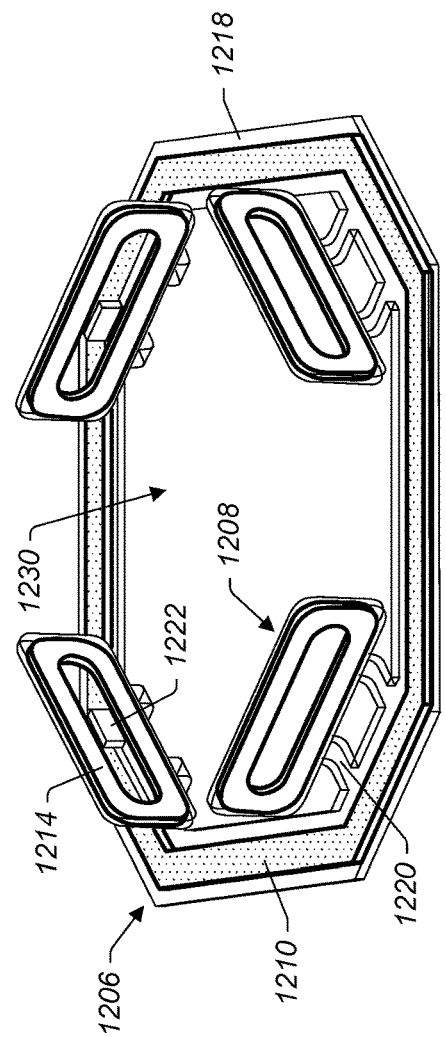

CAMERA WITH IMAGE SENSOR SHIFTING

This patent application is a continuation of U.S. patent application Ser. No. 17/5,566,463, filed Dec. 30, 2021, which is a continuation of U.S. patent application Ser. No. 17/112,411, filed Dec. 4, 2020, now U.S. Pat. No. 11,223,766, which is a continuation of U.S. patent application Ser. No. 16/036,838, filed Jul. 16, 2018, now U.S. Pat. No. 10,863,094, which claims benefit of priority to U.S. provisional patent application No. 62/533,611, filed Jul. 17, 2017, which are hereby incorporated by reference herein in their entirety.

BACKGROUND

Technical Field

This disclosure relates generally to architecture for a camera with image sensor shifting capabilities.

Description of the Related Art

The advent of small, mobile multipurpose devices such as smartphones and tablet or pad devices has resulted in a need for high-resolution, small form factor cameras for integration in the devices. Some small form factor cameras may incorporate optical image stabilization (OIS) mechanisms that may sense and react to external excitation/disturbance by adjusting location of the optical lens on the X and/or Y axis in an attempt to compensate for unwanted motion of the lens. Some small form factor cameras may incorporate an autofocus (AF) mechanism whereby the object focal distance can be adjusted to focus an object plane in front of the camera at an image plane to be captured by the image sensor. In some such autofocus mechanisms, the optical lens is moved as a single rigid body along the optical axis (referred to as the Z axis) of the camera to refocus the camera.

BRIEF SUMMARY OF EMBODIMENTS

A camera may include a voice coil motor (VCM) actuator configured to shift an image sensor along multiple axes. A magnet and coil arrangement of the VCM actuator may include multiple magnets with a respective optical image stabilization (OIS) coil proximate each magnet and an autofocus (AF) coil(s) above and/or below the magnets. A flexure arrangement may suspend a coil carrier assembly holding the OIS and AF coils and a substrate holding the image sensor. Current may be driven in a controlled manner through the coils to move the coil carrier assembly and substrate to shift the image sensor for OIS and/or AF. Some embodiments include a position sensing arrangement of one or more position sensors to provide position feedback for a control loop controlling the position of the image sensor.

BRIEF DESCRIPTION OF THE DRAWINGS

FIG. 1A shows a perspective view of the magnet and coil arrangement. FIG. 1B shows a top view of the magnet and coil arrangement. FIG. 1C shows a cross-sectional view of the magnet and coil arrangement. FIG. 1D shows another cross-sectional view of the magnet and coil arrangement.

FIG. 2A shows a top view of the magnetic layout. FIG. 2B shows a cross-sectional view of the magnetic layout.

FIGS. 3A and 3B illustrate an example magnetic layout of a VCM actuator for shifting an image sensor along multiple axes, in accordance with some embodiments. FIG. 3A shows a top view of the magnetic layout. FIG. 3B shows a cross-sectional view of the magnetic layout.

FIG. 4A shows a top view of the magnetic layout. FIG. 4B shows a cross-sectional view of the magnetic layout.

FIG. 5A shows a top view of the magnetic layout. FIG. 5B shows a cross-sectional view of the magnetic layout.

FIG. 6A shows a top view of the magnetic layout. FIG. 6B shows a cross-sectional view of the magnetic layout.

FIGS. 7A and 7B illustrate an example magnetic layout of a VCM actuator for shifting an image sensor along multiple axes, in accordance with some embodiments. FIG. 7A shows a top view of the magnetic layout. FIG. 7B shows a cross-sectional view of the magnetic layout.

FIGS. 8A-8C illustrate an example position sensing arrangement that may be used to determine positioning of one or more components (e.g., of a camera that includes a VCM actuator for shifting an image sensor along multiple axes), in accordance with some embodiments. FIG. 8A shows a perspective view of the position sensing arrangement. FIG. 8B shows a top view of the position sensing arrangement. FIG. 8C shows a cross-sectional view of the position sensing arrangement.

FIGS. 9A and 9B illustrate an example flexure arrangement 900, in accordance with some embodiments. FIG. 9A shows a perspective view of the flexure arrangement. FIG. 9B shows a cross-sectional view of the flexure arrangement in a camera that includes a VCM actuator for shifting an image sensor along multiple axes.

FIGS. 12C and 12D illustrate perspective views of an example coil structure, in accordance with some embodiments.

Figure 1A:
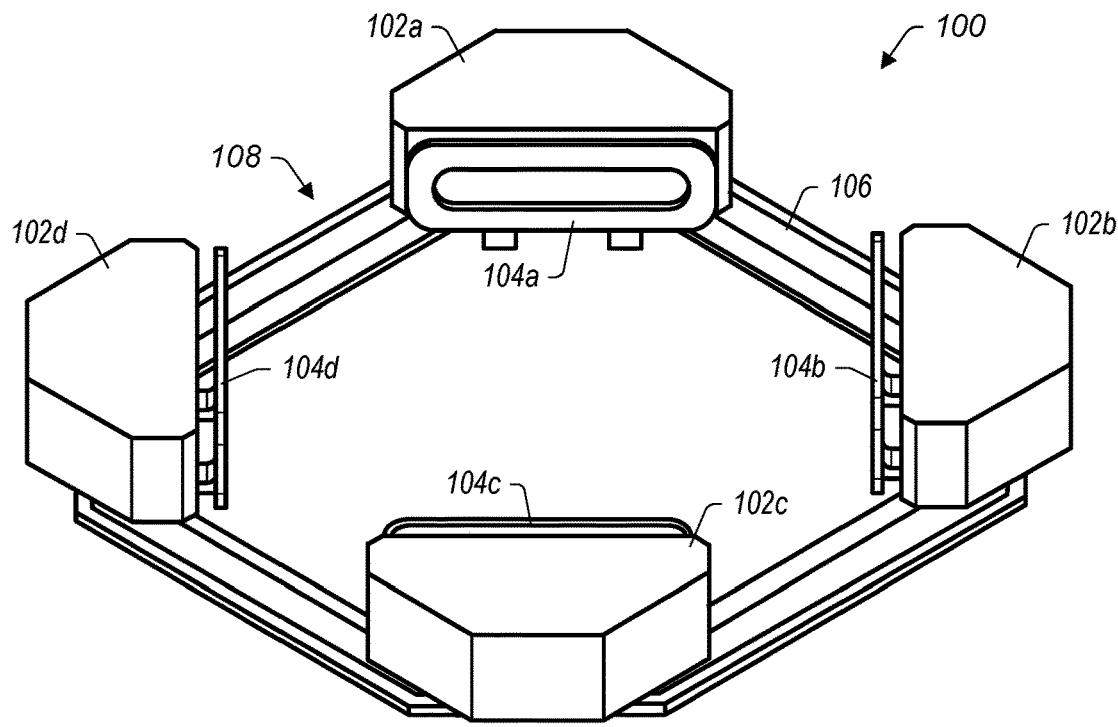
FIGS. 1A-1D illustrate an example magnet and coil arrangement of a voice coil motor (VCM) actuator for shifting an image sensor along multiple axes, in accordance with some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

DETAILED DESCRIPTION

Some embodiments include camera equipment outfitted with controls, magnets, and voice coil motors to improve the effectiveness of a miniature actuation mechanism for a compact camera module. More specifically, in some embodiments, compact camera modules include actuators to deliver functions such as autofocus (AF) and/or optical image stabilization (OIS). One approach to delivering a very compact actuator for OIS is to use a voice coil motor (VCM) arrangement, which uses the selective flow of current through a coil to repel or attract a corresponding magnet, which in turn may produce relative movement between the coil and the magnet. In various embodiments, AF movement may comprise movement of an image sensor along an optical axis. Furthermore, OIS movement may comprise lateral movement of the image sensor relative to the optical axis. As used herein, the optical axis may be the path of light as it impinges on the image sensor. The optical axis is generally referred to herein as the z-axis of a coordinate system (such that AF movement may occur along the z-axis) and the x- and y-axes of the coordinate system may represent a plane perpendicular to the optical axis along which the OIS movement may occur.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

Figure 1B:
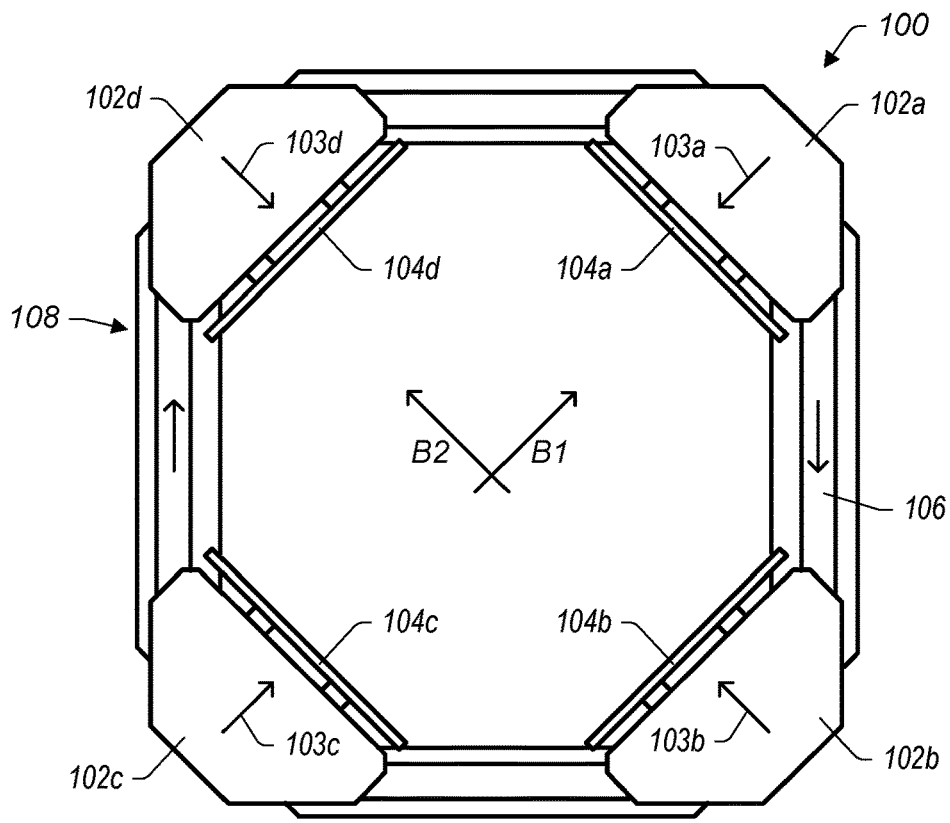
Figure 1C:
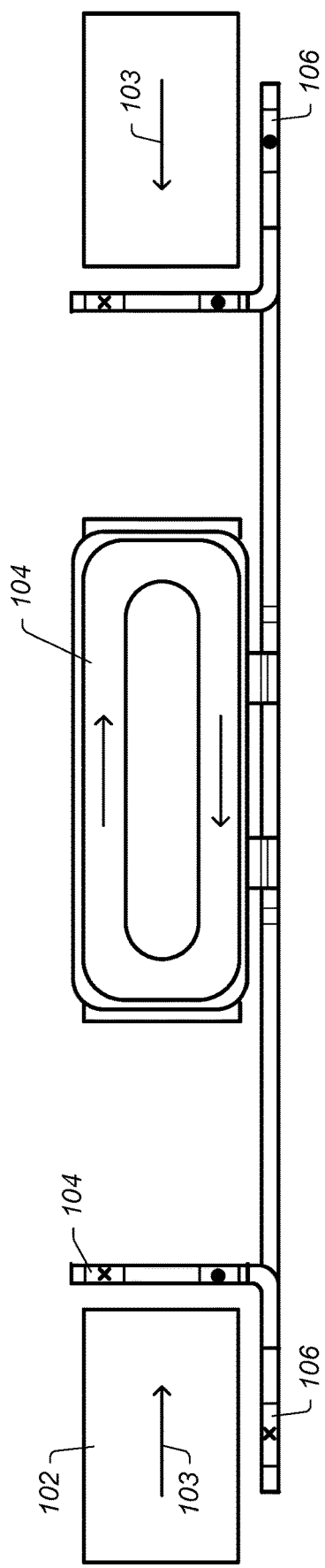
Figure 1D:
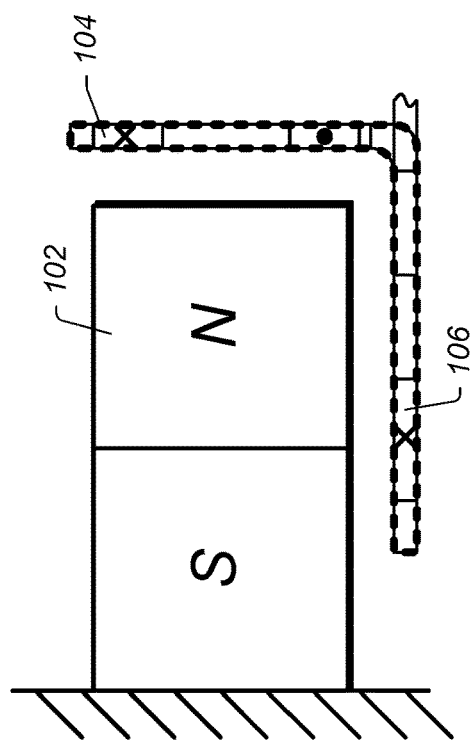

FIGS. 1A-1D illustrate an example magnet and coil arrangement 100 of a voice coil motor (VCM) actuator for shifting an image sensor along multiple axes, in accordance with some embodiments. FIG. 1A shows a perspective view of the magnet and coil arrangement 100. FIG. 1B shows a top view of the magnet and coil arrangement 100. FIG. 1C shows a cross-sectional view of the magnet and coil arrangement 100. FIG. 1D shows another cross-sectional view of the magnet and coil arrangement 100. In some embodiments, the magnet and coil arrangement 100 may include one or multiple features, components, and/or functionality of embodiments described herein with reference to FIGS. 2A-15.

In various embodiments, the magnet and coil arrangement 100 may include one or more magnets 102, one or more optical image stabilization (OIS) coils 104, and one or more autofocus (AF) coils 106. For example, as shown in FIGS. 1A and 1B, the magnet and coil arrangement 100 may include four magnets 102a-102d (which may also be configured and referred to as corner magnets), four OIS coils 104a-104d (which may also be configured and referred to as corner OIS coils or corner coils), and a single AF coil 106. The magnets 102 may be located proximate the OIS coils 104. For instance, each of the magnets 102 may be located to a respective side of a respective OIS coil 104. Specifically, the corresponding magnet 102 for a given OIS coil is the magnet that provides the primary magnetic force to the OIS coil when a current is driven through the coil (it may be desirable for the magnets and OIS coils to be spaced from each other so that magnet corresponding to a first OIS coil has negligible impact on a second OIS coil corresponding to a different magnet). Furthermore, the magnets 102 may be located proximate the AF coil 106. For instance, the magnets 102 may be located above the AF coil 106, e.g., as shown in FIG. 1A. The AF coil 106 may be located proximate a plurality of magnets, and thus multiple magnets may provide magnetic forces for moving the AF coil 106 when current is driven through the coil.

When the magnet and coil arrangement 100 is integrated into a camera as described below, in some embodiments the AF coil 106 may be oriented in a plane perpendicular to an optical axis of the camera (e.g., optical axis 910 described herein with reference to FIG. 9B). The OIS coils 104 may be positioned in respective planes each parallel to the optical axis. When the magnet and coil arrangement comprises two or more OIS coils (e.g., first, second, third, and fourth OIS coils 104a-104d), some OIS coils may be parallel to each other. For example, in the embodiment shown in FIG. 1B, the first and third OIS coils 104a and 104c may be parallel to each other (i.e., the first OIS coil 104a may be positioned in a first plane that is parallel to a second plane in which the third OIS coil 104c is positioned). Similarly, the second and fourth OIS coils 104b and 104d may be parallel to each other.

The AF coil 106 may be sized to surround the image sensor, although the AF coil 106 need not be in the same plane as the image sensor. Accordingly, the magnet and coil arrangement 100 may be positioned within a camera such that the AF coil 106 circumscribes a portion of the light path of light imaged by the image sensor, which may allow the AF coil 106 to provide autofocus actuation without limiting or otherwise impinging on the field of view of the camera.

As mentioned above, in some embodiments, the one or more magnets 102 may be configured as corner magnets. In these variations the corner magnets 102 may have respective polarity alignments (depicted by arrows 103a-d in FIGS. 1B and 1C) in respective directions that are angled (e.g., at 45 degrees) relative to at least one side of a camera module. In various embodiments, a camera module may include four sides that define rectangle when viewed from above, and the respective directions of the respective polarity alignments of the corner magnets 102 may be angled relative to at least one of the four sides of the camera module. This may facilitate placement of the magnets 102 in the corners of the camera module (and in some instances one or more of the magnets 102 may optionally have a trapezoidal cross-section along the x-y plane which may further facilitate placement of the magnets 102 in the corners of the camera module). Additionally, or alternatively, the respective directions of the respective polarity alignments of the corner magnets 102 may be coincident with respective planes that are orthogonal to the AF coil 106 and that intersect with respective corners of a camera module.

In some embodiments, opposing pairs of the OIS coils 104 may be used to provide OIS movement in different directions. Typically the coils of an opposing pair of OIS coils may be positioned within respective parallel planes. Additionally, in some variations each the coils of an opposing pair of OIS coils may further be centered along a line that is perpendicular to the parallel planes. For instance, two OIS coils (e.g., the first and third OIS coils 104a and 104c depicted in FIGS. 1A and 1B) may form a first opposing pair of OIS coils 104 that provide OIS movement in a first direction, e.g., as indicated by arrow B1. When the magnets associated with the first and third OIS coils 104a and 104c (e.g., the first and third magnets 102a and 102c) are configured as corner magnets in a camera module, this first direction B1 may intersect two corners of the camera module. Two additional OIS coils (e.g., second and fourth OIS coils 104b and 104d) may form a second opposing pair of OIS coils 104 that provide OIS movement in a second direction, e.g., as indicated by arrow B2. In some instances, the first direction B1 may be orthogonal to the second direction B2. Again, when the magnets associated with the second and fourth OIS coils 104b and 104d (e.g., the second and fourth magnets 102b and 102d) are configured as corner magnets in a camera module, this first direction B2 may intersect two corners of the camera module. In these embodiments, the device may activate one or both of the first opposing pair of OIS coils 104 (i.e., by driving current through the coil or coils) to control movement along direction B1 and may activate one or both of the second opposing pairs of OIS coils 104 to control movement along direction B2. Collectively, the two sets of opposing pairs of OIS coils may provide two-dimensional movement in the x-y plane.

Some variations of the embodiments described here need not comprise opposing pairs of OIS coils, but there may be advantages to including opposing pairs of OIS coils. For example, an opposing pair of OIS coils may provide a more linear force response as compared to a single OIS coil. Typically, when a driven coil moves away from the magnet, the magnetic force between the coil and magnet decreases and thus may require a non-linear increase in driving current to continue to move the coil away from the magnet. With an opposing pair of OIS coils, a first coil of a pair may push away from its respective magnet while the second coil of the pair may pull towards its respective magnet. While it may take more current to provide the pushing force as the separation between the first coil and its respective magnet increases, it will take less current to provide the pulling force as the separation between the second coil and its magnet decreases. Additionally, driving opposing pairs of OIS coils may help to cancel out torques that may otherwise be provided to the coil arrangement by driving a single OIS coil.

In some examples, the OIS coils 104 and the AF coil 106 may be part of a common coil structure 108, e.g., as described below with reference to FIGS. 12C and 12D. The coil structure may comprise a holding structure (e.g., a frame or the like) which may hold the OIS coils 104 and AF coil in a fixed relationship, such as discussed in more detail below. When the magnet and coil arrangement 100 is integrated into a camera module, the arrangement may be integrated such that the coils (OIS coils 104 and AF coil 106) are moveable relative to the magnets 102. In some embodiments, the coil structure 108 may be movable to provide OIS and/or AF movement, while the magnets 102 may be stationary (e.g., held in a fixed relationship to the camera module).

In some embodiments, the OIS coils 104 may be oriented orthogonal to the AF coil 106. For example, the OIS coils 104 may be vertically oriented (i.e., positioned in a plane that is oriented parallel to the optical/z-axis), while the AF coil 106 may be horizontally oriented (i.e., positioned in a plane that is perpendicular to the optical/z-axis).

FIG. 1D illustrates one embodiment of the polarity alignment of a magnet 102 relative to an OIS coil 104 and AF coil 106. For example, FIG. 1D may illustrated the magnet and coils on the left side of FIG. 1C. In an embodiment in which the magnet and coil arrangement 100 is included in a camera, the magnet 102 may be attached to a non-moving structure of the camera module. As illustrated, the north-south polarity alignment of magnet 102 is in a direction (as shown by arrow 103 in FIG. 1C) perpendicular to a plane in which OIS coil 104 lies and parallel to a plane in which AF coil 106 lies, with the north pole closer to OIS coil 104 and the south pole close to an outer perimeter of the magnet and coil arrangement 100. While the illustrated embodiment shows the north pole of magnet 102 facing OIS coil 104, in other embodiments, the polarity may be reversed such that the south pole faces OIS magnet 104. In such an embodiment, for a given direction of movement, the current by be driven in the opposite direction in OIS coil 104 and AF coil 106 than for the embodiment illustrated in FIG. 1D.

Figures 2A, 2B:
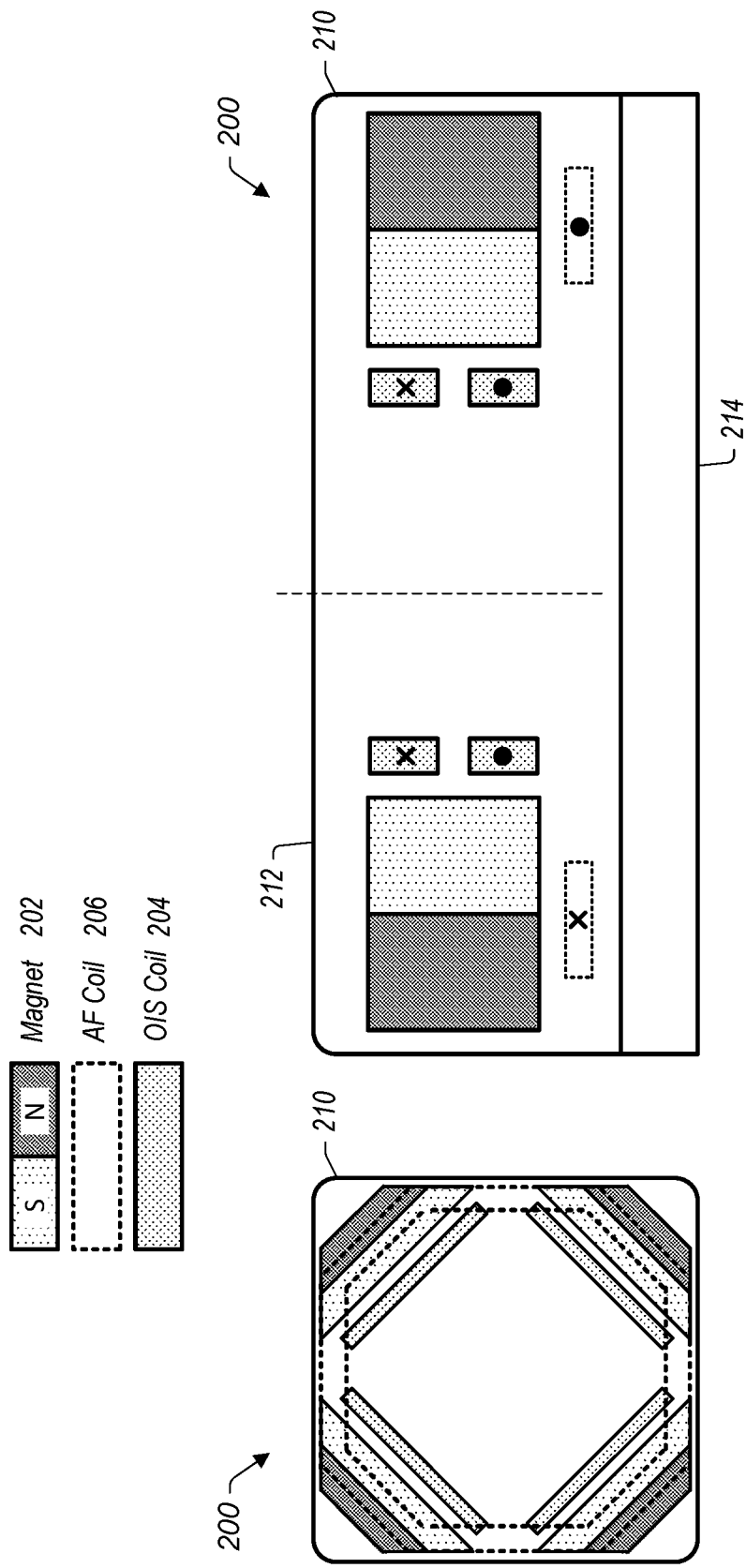
FIGS. 2A and 2B illustrate an example magnetic layout of a VCM actuator for shifting an image sensor along multiple axes, in accordance with some embodiments.

When a magnet and coil arrangement is incorporated into a camera module, the magnets and coils may have different orientations relative to each other and relative to the rest of the camera module. In some instances, a magnet and coil arrangement may be configured to have a first AF coil that is positioned below the magnets (relative to the direction of incoming light), and one or more OIS coils that are each positioned between a corresponding magnet and the optical axis. FIGS. 2A and 2B illustrate one such example of a magnetic layout 200 of a voice coil motor (VCM) actuator for shifting an image sensor along multiple axes, in accordance with some embodiments. Magnetic layout 200 is shown incorporated into a housing 210 of a camera module, although other elements of the camera module (e.g., an image sensor, lens, or the like) are not shown here. FIG. 2A shows a top view of the magnetic layout 200. FIG. 2B shows a cross-sectional view of the magnetic layout 200 taken along a diagonal of the camera module. In some embodiments, the magnetic layout 200 may include one or multiple features, components, and/or functionality of embodiments described herein with reference to FIGS. 1A, 1B, and 3A-15.

In various embodiments, the magnetic layout 200 may include a plurality of magnets 202 configured as corner magnets, one or more inside optical image stabilization (OIS) coils 204, and a bottom side autofocus (AF) coil 206, e.g., as shown in FIGS. 2A and 2B. For instance, the magnetic layout 200 may include four corner magnets 202 that are each located proximate a respective corner of a camera module. Each of the corner magnets 202 may have a respective side that faces inward, e.g., in a direction opposite the respective corner of the camera module and/or in a direction toward a central portion of the camera module. The magnetic layout 200 may include a plurality of inside OIS coils 204 (e.g., four OIS coils) that are each located proximate an inward-facing side of a respective corner magnets 202, such that the OIS coil is positioned between the respective corner magnet and the optical axis, and the respective corner magnet is positioned between the OIS coil and the housing 210. The bottom side AF coil 206 may be located below the corner magnets 202.

When an element is described here as being positioned "above" or "below" another element, this relative positioning is based on an orientation where the imaging side of the image sensor faces a top side of the camera module and faces away from a bottom side of the camera module. Accordingly, if a first element is above a second element, the first element is closer to the top side of the camera module. For example, in the embodiment shown in FIGS. 2A and 2B, magnets 202 may be closer to a top side 212 of the housing 210 and the AF coil 206 may be closer to the bottom side 214 of the housing 210, and thus the AF coil 206 is considered to be below the magnets 202. While FIGS. 2A and 2B show the AF coil 206 being a bottom side AF coil (i.e., positioned below the magnets 202), it should be appreciated that in other instances the AF coil 206 may be a top side AF coil where the AF coil is positioned above the magnets 202.

As mentioned above with respect to FIGS. 1A-1D, in some examples, the inside OIS coils 204 and the bottom side AF coil 206 may be part of a common coil structure (not shown) that may be movable to provide OIS and/or AF movement, while the corner magnets 202 may be stationary. Furthermore, in some embodiments, the inside OIS coils 204 may be oriented orthogonal to the bottom side AF coil 206 (i.e., a given OIS coil may be positioned within a respective plane that is perpendicular to the plane in which the AF coil is positioned, such as discussed above with respect to FIGS. 1A-1D). For example, the inside OIS coils 204 may be vertically oriented, while the bottom side AF coil 206 may be horizontally oriented. In some instances when an OIS coil is positioned proximate a corner magnet (such as shown in FIG. 2A), the plane in which the OIS coil is positioned may be perpendicular to a diagonal of the camera module.

Example directions of current flow through the inside OIS coils 204 and the bottom side AF coil 206 are indicated in FIG. 2B using crosses (Xs) and dots (•s). The crosses indicate current flowing "into the page," and the dots indicate current flowing "out of the page." This convention carries over in all embodiments. Furthermore, hatching/shading as shown in the legend is used in FIGS. 2A and 2B to indicate example North and South pole orientations of the corner magnets 202.

In variations where the OIS coils 204 include one or more sets of opposing OIS coil pairs (such as the two OIS coils depicted in FIG. 2B), the current direction through each coil is chosen to achieve a given direction of movement of the OIS coils relative to the magnets. For example, in the cross-section shown in FIG. 2B, the magnets on opposite sides of the optical axis have reverse polarities (e.g., the north pole of each magnet faces the closest exterior corner of the housing 210). In these instances, current may be driven in the same direction in each of the opposing pair of OIS coils to create magnetic forces in a common direction.

For example, as current is driven through the left OIS coil 204 in the direction shown in FIG. 2B, the left OIS coil 204 is attracted to the left magnet 202 (which would pull the OIS coil 204 toward the left). As current is driven through the right OIS coil 204, the right OIS coil 204 is repelled by the right magnet 202, which would push the right OIS coil 204 to the left. When the left and right OIS coils are connected to a common structure, this may result in leftward movement of the coil structure. The current direction may be reversed to move the OIS coils to the right. It should be appreciated, both in this embodiment and the other magnet and coil arrangement embodiments described here, that changing the North/South orientation of a given magnet or the relative positioning between an OIS coil and its respective magnet may require a change in current direction needed to move the OIS coil in a certain direction.

While the magnetic layout 200 shown in FIGS. 2A and 2B depict a single AF coil, it should be appreciated that in some instance a magnet and coil arrangement may comprise a plurality of AF coils. FIGS. 3A and 3B illustrate an example magnetic layout 300 of a voice coil motor (VCM) actuator for shifting an image sensor along multiple axes, in accordance with some embodiments. Magnetic layout 300 is shown incorporated into a housing 310 of a camera module, although other elements of the camera module (e.g., an image sensor, lens, or the like) are not shown here. FIG. 3A shows a top view of the magnetic layout 300. FIG. 3B shows a cross-sectional view of the magnetic layout 300 taken along a diagonal of the camera module. In some embodiments, the magnetic layout 300 may include one or multiple features, components, and/or functionality of embodiments described herein with reference to FIGS. 1A-2B and 4A-15.

In various embodiments, the magnetic layout 300 may include a plurality magnets 302 configured as corner magnets, one or more inside optical image stabilization (OIS) coils 304, a first bottom side autofocus (AF) coil 306, and a second top side AF coil 308, e.g., as shown in FIGS. 3A and 3B. For instance, the magnetic layout 300 may include four corner magnets 302 that are each located proximate a respective corner of a camera module. Each of the corner magnets 302 may have a respective side that faces inward, e.g., in a direction opposite the respective corner of the camera module and/or in a direction toward a central portion of the camera module. The magnetic layout 300 may include a plurality of inside OIS coils 304 (e.g., four OIS coils) that are each located proximate an inward-facing side of a respective corner magnets 302, such that the OIS coil is positioned between the respective corner magnet and the optical axis and the respective corner magnet is positioned between the OIS coil and the housing 310. The bottom side AF coil 306 may be located below the corner magnets 302. The top side AF coil 308 may be located above the corner magnets 302.

In some examples, the inside OIS coils 304, the bottom side AF coil 306, and/or the top side AF coil 308 may be part of a common coil structure (not shown) that may be movable to provide OIS and/or AF movement, while the corner magnets 302 may be stationary. Furthermore, in some embodiments, the inside OIS coils 304 may be oriented orthogonal to the bottom side AF coil 306 and/or the top side AF coil 308. In other words, a given OIS coil may be positioned within a respective plane that is perpendicular to a plane in which the top side or bottom side AF coil is positioned. When the bottom side AF coil 306 and top side AF coil 308 are positioned in first and second parallel planes, a given OIS coil may be positioned in a respective plane that is perpendicular to both the first and second parallel planes. For example, the inside OIS coils 304 may be vertically oriented, while the bottom side AF coil 306 and/or the top side AF coil 308 may be horizontally oriented.

Example directions of current flow through the inside OIS coils 304, the bottom side AF coil 306, and the top side AF coil 308 are indicated in FIG. 3B. In some embodiments, current may flow through the bottom side AF coil 306 and the top side AF coil 308 in the same direction, which may promote forces in a common direction between the bottom side AF coil 306 and magnets 302 and between the top side AF coil 308 and magnets 302. Furthermore, hatching/shading as shown in the legend is used in FIGS. 3A and 3B to indicate example North and South pole orientations of the corner magnets 302.

Figures 4A, 4B:
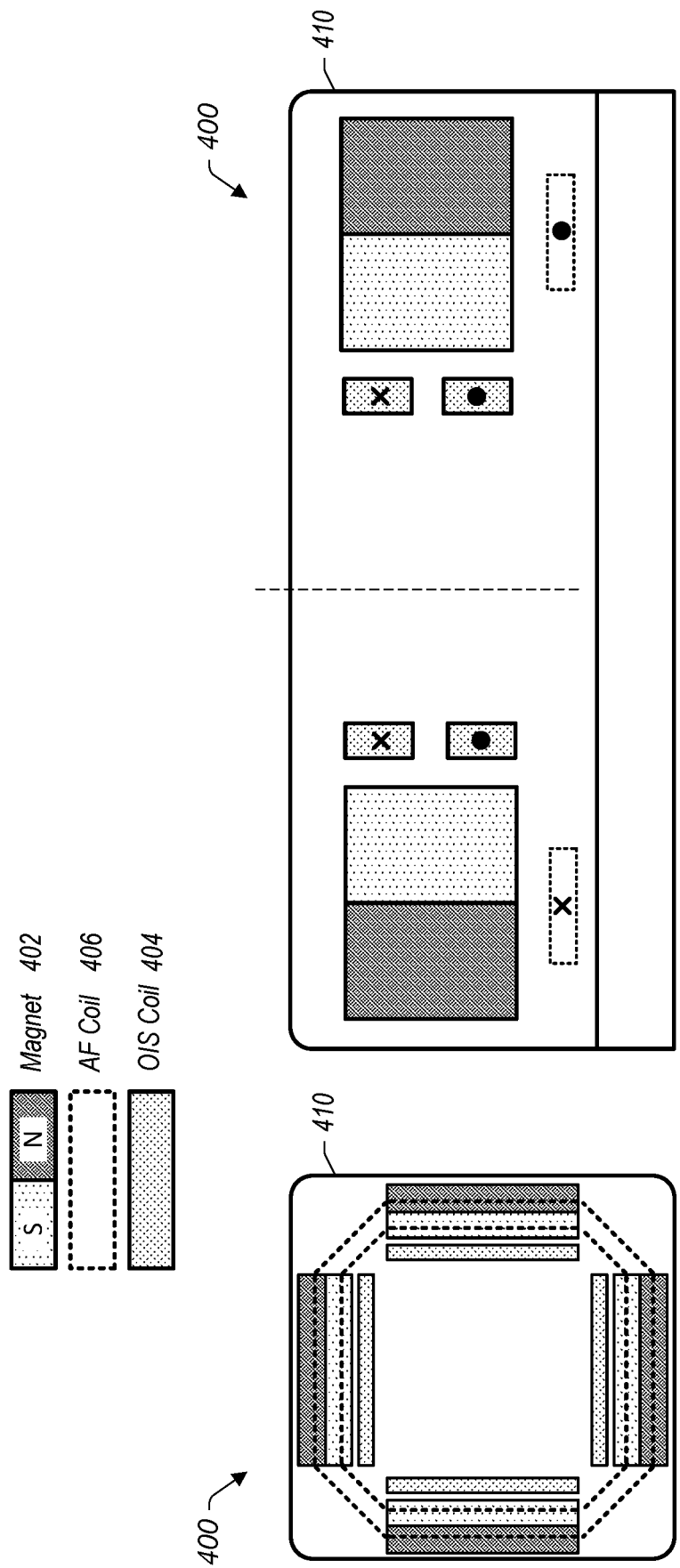
FIGS. 4A and 4B illustrate an example magnetic layout of a VCM actuator for shifting an image sensor along multiple axes, in accordance with some embodiments.

While the magnets discussed above with respect to FIGS. 2A, 2B, 3A, and 3C are configured as corner magnets, in other instances one or more magnets may be configured as side magnets. FIGS. 4A and 4B illustrate an example magnetic layout 400 of a voice coil motor (VCM) actuator for shifting an image sensor along multiple axes, in accordance with some embodiments. Magnetic layout 400 is shown incorporated into a housing 410 of a camera module, although other elements of the camera module (e.g., an image sensor, lens, or the like) are not shown here. FIG. 4A shows a top view of the magnetic layout 400. FIG. 4B shows a cross-sectional view of the magnetic layout 400 taken along a direction parallel to a side of the camera module. In some embodiments, the magnetic layout 400 may include one or multiple features, components, and/or functionality of embodiments described herein with reference to FIGS. 1A-3B and 5A-15.

In various embodiments, the magnetic layout 400 may include a plurality of magnets 402 configured as side magnets, one or more inside optical image stabilization (OIS) coils 404, and a bottom side autofocus (AF) coil 406, e.g., as shown in FIGS. 4A and 4B. For instance, the magnetic layout 400 may include four side magnets 402 that are each located proximate a respective side of a camera module. Each of the side magnets 402 may have a respective side that faces inward, e.g., in a direction opposite the respective side of the camera module and/or in a direction toward a central portion of the camera module. In some embodiments the inward-facing side of a side magnet may be parallel to the respective side of the camera module. In some embodiments, the side magnets 402 may have respective polarity alignments in respective directions that are orthogonal to at least one side of the camera module. In various embodiments, the camera module may include four sides that define rectangle when viewed from above, and the respective directions of the respective polarity alignments of the side magnets 402 may be angled relative to at least one of the four sides of the camera module.

The magnetic layout 400 may include a plurality of inside OIS coils 404 (e.g., four inside OIS coils 404) that are each located proximate a respective inward-facing side of the side magnets 402, such that the inside OIS coil is positioned between the respective side magnet and the optical axis and the respective side magnet is positioned between the OIS coil and the housing 410. The bottom side AF coil 406 may be located below the side magnets 402. While FIGS. 4A and 4B show the AF coil 406 being a bottom side AF coil (i.e., positioned below the magnets 402), it should be appreciated that in other instances the AF coil 406 may be a top side AF coil where the AF coil is positioned above the magnets 402.

In some examples, the inside OIS coils 404 and the bottom side AF coil 406 may be part of a common coil structure (not shown) that may be movable to provide OIS and/or AF movement, while the side magnets 402 may be stationary. Furthermore, in some embodiments, the inside OIS coils 404 may be oriented orthogonal to the bottom side AF coil 406 (i.e., a given OIS coil may be positioned within a respective plane that is perpendicular to the plane in which the AF coil is positioned, such as discussed above with respect to FIGS. 1A-1D). For example, the inside OIS coils 404 may be vertically oriented, while the bottom side AF coil 406 may be horizontally oriented. In some instances when an OIS coil is positioned proximate a side magnet (such as shown in FIG. 4A), the plane in which the OIS coil is positioned may be parallel to a respective side of the camera module.

Example directions of current flow through the inside OIS coils 404 and the bottom side AF coil 406 are indicated in FIG. 4B. Furthermore, hatching/shading as shown in the legend is used in FIGS. 4A and 4B to indicate example North and South pole orientations of the side magnets 402.

Figures 5A, 5B:
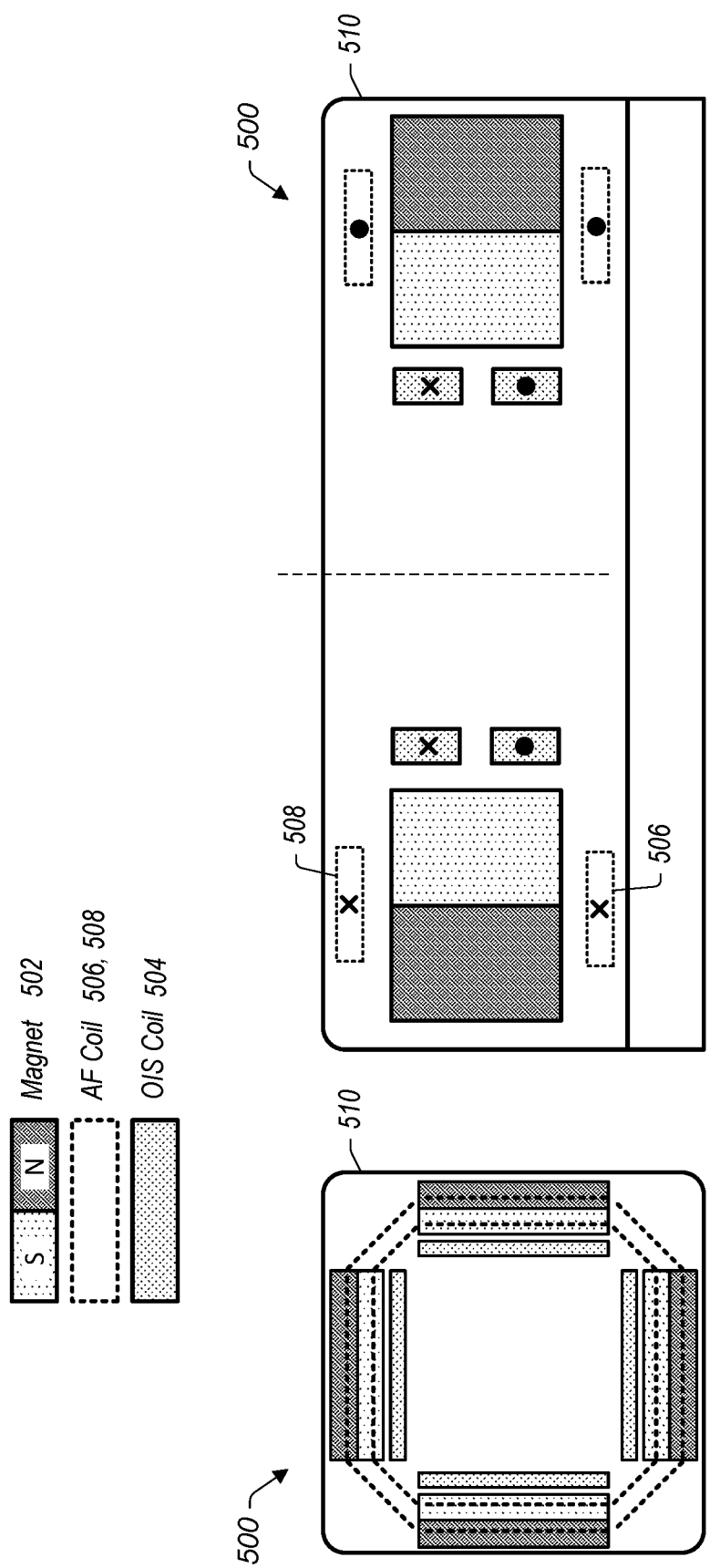
FIGS. 5A and 5B illustrate an example magnetic layout of a VCM actuator for shifting an image sensor along multiple axes, in accordance with some embodiments.

FIGS. 5A and 5B illustrate another example magnetic layout 500 of a voice coil motor (VCM) actuator for shifting an image sensor along multiple axes, in accordance with some embodiments. Magnetic layout 500 is shown incorporated into a housing 510 of a camera module, although other elements of the camera module (e.g., an image sensor, lens, or the like) are not shown here. FIG. 5A shows a top view of the magnetic layout 500. FIG. 5B shows a cross-sectional view of the magnetic layout 500 taken along a direction parallel to a side of the camera module. In some embodiments, the magnetic layout 500 may include one or multiple features, components, and/or functionality of embodiments described herein with reference to FIGS. 1A-4B and 6A-15.

In various embodiments, the magnetic layout 500 may include a plurality of magnets 502 configured as side magnets, one or more inside optical image stabilization (OIS) coils 504, a bottom side autofocus (AF) coil 506, and a top side AF coil 508, e.g., as shown in FIGS. 5A and 5B. For instance, the magnetic layout 500 may include four side magnets 502 that are each located proximate a respective side of a camera module. Each of the side magnets 502 may have a respective side that faces inward, e.g., in a direction opposite the respective side of the camera module and/or in a direction toward a central portion of the camera module. In some embodiments the inward-facing side of a side magnet may be parallel to the respective side of the camera module. The magnetic layout 500 may include a plurality of inside OIS coils 504 (e.g., four) that are each located proximate a respective inward-facing side of the side magnets 502, such that the inside OIS coil is positioned between the respective side magnet and the optical axis and the respective side magnet is positioned between the OIS coil and the housing 510. The bottom side AF coil 506 may be located below the side magnets 502. The top side AF coil 508 may be located above the side magnets 502.

In some examples, the inside OIS coils 504, the bottom side AF coil 506, and/or the top side AF coil 508 may be part of a common coil structure (not shown) that may be movable to provide OIS and/or AF movement, while the side magnets 502 may be stationary. Furthermore, in some embodiments, the inside OIS coils 504 may be oriented orthogonal to the bottom side AF coil 506 and/or the top side AF coil 508. In other words, a given OIS coil may be positioned within a respective plane that is perpendicular to a plane in which the top side or bottom side AF coil is positioned. When the bottom side AF coil 506 and top side AF coil 508 are positioned in first and second parallel planes, a given OIS coil may be positioned in a respective plane that is perpendicular to both the first and second parallel planes. For example, the inside OIS coils 504 may be vertically oriented, while the bottom side AF coil 506 and/or the top side AF coil 508 may be horizontally oriented. In some instances when an OIS coil is positioned proximate a side magnet (such as shown in FIG. 5A), the plane in which the OIS coil is positioned may be parallel to a respective side of the camera module.

Example directions of current flow through the inside OIS coils 504, the bottom side AF coil 506, and the top side AF coil 508 are indicated in FIG. 5B. In some embodiments, current may flow through the bottom side AF coil 506 and the top side AF coil 508 in the same direction, which may promote forces in a common direction between the bottom side AF coil 506 and magnets 502 and between the top side AF coil 508 and magnets 502. Furthermore, hatching/shading as shown in the legend is used in FIGS. 5A and 5B to indicate example North and South pole orientations of the side magnets 502.

Figures 6A, 6B:
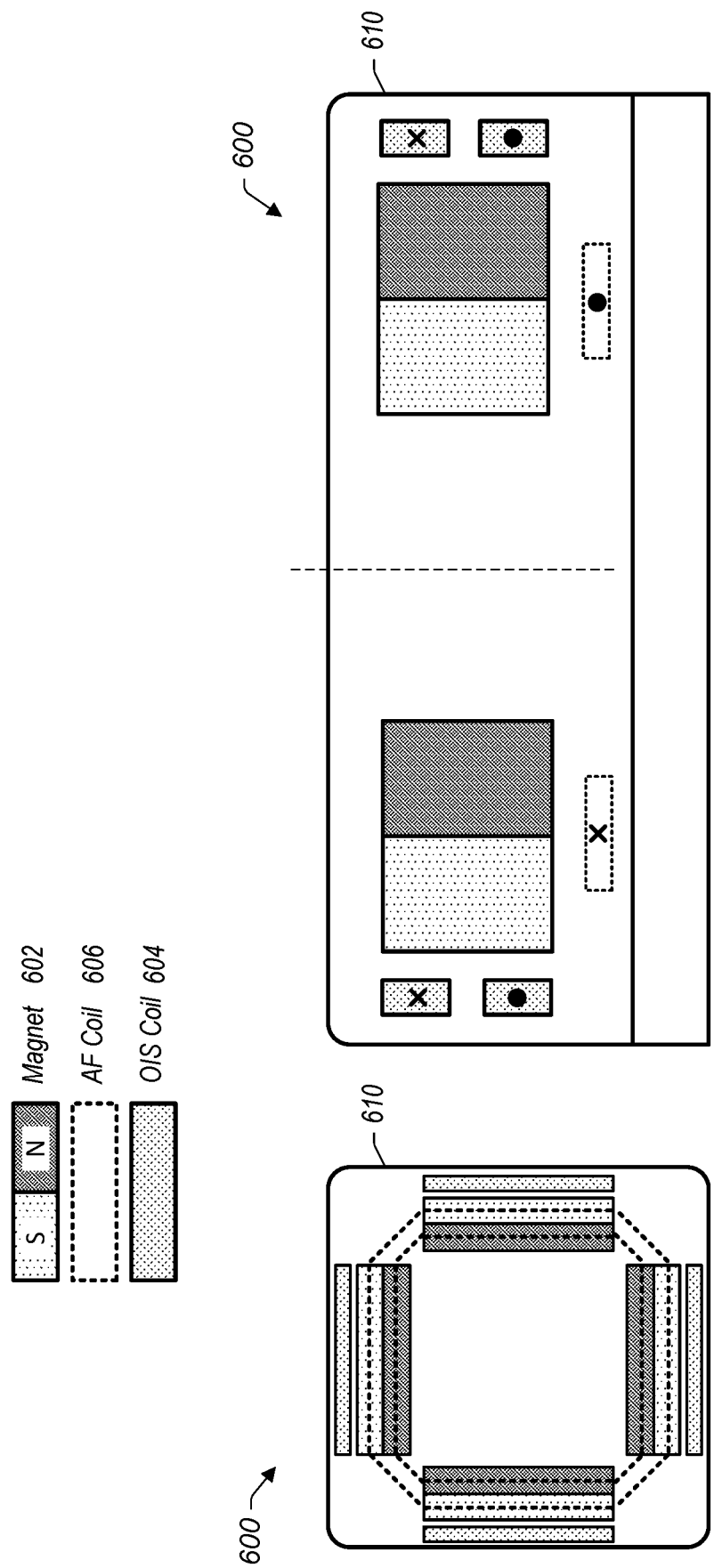
FIGS. 6A and 6B illustrate an example magnetic layout of a VCM actuator for shifting an image sensor along multiple axes, in accordance with some embodiments.

While an OIS coil of a magnet and coil arrangement may be configured as an inside OIS coil as described in more detail above, it should be appreciated that in other instances an OIS coil may be configured as an outside OIS coil. FIGS. 6A and 6B illustrate one such example of a magnetic layout 600 of a voice coil motor (VCM) actuator for shifting an image sensor along multiple axes, in accordance with some embodiments. Magnetic layout 600 is shown incorporated into a housing 610 of a camera module, although other elements of the camera module (e.g., an image sensor, lens, or the like) are not shown here. FIG. 6A shows a top view of the magnetic layout 600. FIG. 6B shows a cross-sectional view of the magnetic layout 600 taken along a direction parallel to a side of the camera module. In some embodiments, the magnetic layout 600 may include one or multiple features, components, and/or functionality of embodiments described herein with reference to FIGS. 1A-5B and 7A-15.

In various embodiments, the magnetic layout 600 may include a plurality of magnets 602 configured as side magnets, one or more outside optical image stabilization (OIS) coils 604, and a bottom side autofocus (AF) coil 606, e.g., as shown in FIGS. 6A and 6B. For instance, the magnetic layout 600 may include four side magnets 602 that are each located proximate a respective side of a camera module. Each of the side magnets 602 may have a respective side that faces outward, e.g., in a direction toward the respective side of the camera module and/or in a direction opposite a central portion of the camera module. In some embodiments the outward-facing side of a side magnet may be parallel to the respective side of the camera module.

The magnetic layout 600 may include a plurality of outside OIS coils 604 (e.g., four outside OIS coils 604) that are each located proximate a respective outward-facing side of the side magnets 602, such that the respective side magnet is positioned between the outside OIS coil and the optical axis, and the OIS coil is positioned between the respective side magnet and the housing 610. The bottom side AF coil 606 may be located below the side magnets 602. While FIGS. 6A and 6B show the AF coil 606 being a bottom side AF coil (i.e., positioned below the magnets 602), it should be appreciated that in other instances the AF coil 406 may be a top side AF coil where the AF coil is positioned above the magnets 602.

In some examples, the outside OIS coils 604 and the bottom side AF coil 606 may be part of a common coil structure (not shown) that may be movable to provide OIS and/or AF movement, while the side magnets 602 may be stationary. Furthermore, in some embodiments, the outside OIS coils 604 may be oriented orthogonal to the bottom side AF coil 606 (i.e., a given OIS coil may be positioned within a respective plane that is perpendicular to the plane in which the AF coil is positioned, such as discussed above with respect to FIGS. 1A-1D). For example, the outside OIS coils 604 may be vertically oriented, while the bottom side AF coil 606 may be horizontally oriented. In some instances when an OIS coil is positioned proximate a side magnet (such as shown in FIG. 6A), the plane in which the OIS coil is positioned may be parallel to a respective side of the camera module.

Example directions of current flow through the outside OIS coils 604 and the bottom side AF coil 606 are indicated in FIG. 6B. Furthermore, hatching/shading as shown in the legend is used in FIGS. 6A and 6B to indicate example North and South pole orientations of the side magnets 602.

FIGS. 7A and 7B illustrate another example magnetic layout 700 of a voice coil motor (VCM) actuator for shifting an image sensor along multiple axes, in accordance with some embodiments. Magnetic layout 700 is shown incorporated into a housing 710 of a camera module, although other elements of the camera module (e.g., an image sensor, lens, or the like) are not shown here. FIG. 7A shows a top view of the magnetic layout 700. FIG. 7B shows a cross-sectional view of the magnetic layout 700 taken along a direction parallel to a side of the camera module. In some embodiments, the magnetic layout 700 may include one or multiple features, components, and/or functionality of embodiments described herein with reference to FIGS. 1A-6B and 8A-15.

In various embodiments, the magnetic layout 700 may include a plurality of magnets 702 configured as side magnets, one or more outside optical image stabilization (OIS) coils 704, a bottom side autofocus (AF) coil 706, and a top side AF coil 708, e.g., as shown in FIGS. 7A and 7B. For instance, the magnetic layout 700 may include four side magnets 702 that are each located proximate a respective side of a camera module. Each of the side magnets 702 may have a respective side that faces outward, e.g., in a direction toward the respective side of the camera module and/or in a direction opposite a central portion of the camera module. In some embodiments the outward-facing side of a side magnet may be parallel to the respective side of the camera module.

The magnetic layout 700 may include a plurality of outside OIS coils 704 (e.g., four OIS coils) that are each located proximate a respective outward-facing side of the side magnets 702 such that the respective side magnet is positioned between the outside OIS coil and the optical axis and the OIS coil is positioned between the respective side magnet and the housing 710. The bottom side AF coil 706 may be located below the side magnets 702. The top side AF coil 708 may be located above the side magnets 702.

In some examples, the outside OIS coils 704, the bottom side AF coil 706, and/or the top side AF coil 708 may be part of a same coil structure that may be movable to provide OIS and/or AF movement, while the side magnets 702 may be stationary. Furthermore, in some embodiments, the outside OIS coils 704 may be oriented orthogonal to the bottom side AF coil 706 and/or the top side AF coil 708. In other words, a given OIS coil may be positioned within a respective plane that is perpendicular to a plane in which the top side or bottom side AF coil is positioned. When the bottom side AF coil 706 and top side AF coil 708 are positioned in first and second parallel planes, a given OIS coil 704 may be positioned in a respective plane that is perpendicular to both the first and second parallel planes. For example, the outside OIS coils 704 may be vertically oriented, while the bottom side AF coil 706 and/or the top side AF coil 708 may be horizontally oriented. In some instances when an OIS coil is positioned proximate a side magnet (such as shown in FIG. 7A), the plane in which the OIS coil is positioned may be parallel to a respective side of the camera module.

Example directions of current flow through the outside OIS coils 704, the bottom side AF coil 706, and the top side AF coil 708 are indicated in FIG. 7B. In some embodiments, current may flow through the bottom side AF coil 706 and the top side AF coil 708 in the same direction, which may promote forces in a common direction between the bottom side AF coil 706 and magnets 702 and between the top side AF coil 708 and magnets 702. Furthermore, hatching/shading as shown in the legend is used in FIGS. 7A and 7B to indicate example North and South pole orientations of the side magnets 702.

While the embodiments of magnet and coil arrangements depicted above have generally showed embodiments having the same number of magnets and OIS coils, it should be appreciated that in some embodiments the number of OIS coils may be different than the number of magnets. For example, in some embodiments there may be fewer OIS coils than magnets. In these embodiments, there may be one or more magnets that does not have a corresponding OIS coil positioned in proximity thereof (and thus may not materially add to the x-y movement of the coils), but these magnets still may assist with movement of the AF coil.

It should be further appreciated that the magnet and coil arrangements described here may comprise any suitable number of magnets for moving the coils as well as different combinations of corner and side magnets and inside and outside OIS coils. For example, while certain embodiments described above show four side magnets (one positioned adjacent each side of the camera module), there may be fewer than four side magnets (e.g., one or more of the sides may not have a magnet positioned adjacent thereto) or more than four magnets (e.g., more than one magnet may be positioned adjacent to each of one or more sides of the camera module). Additionally or alternatively, a camera module may have a magnet and coil arrangement comprising a combination of one or more side magnets and one or more corner magnets. Additionally or alternatively, a camera module may have a magnet and coil arrangement comprising a combination of inside OIS coils and outside OIS coils. As an example, a magnet and coil arrangement may comprise two opposing pairs of OIS coils positioned along the same direction. In this embodiment, a first opposing pair of OIS coils may comprise a first and second outer OIS coils and the second opposing pair of OIS coils may comprise first and second inner OIS coils. In these embodiments, a first magnet be position between the first inner OIS coil and the first outer OIS coil while a second magnet may be positioned between the second inner OIS coil and the second outer OIS coil. Having two pairs of opposing OIS coils along a common direction may increase the stability and responsiveness of the VCM actuator, but increases device complexity.

Figure 8A:
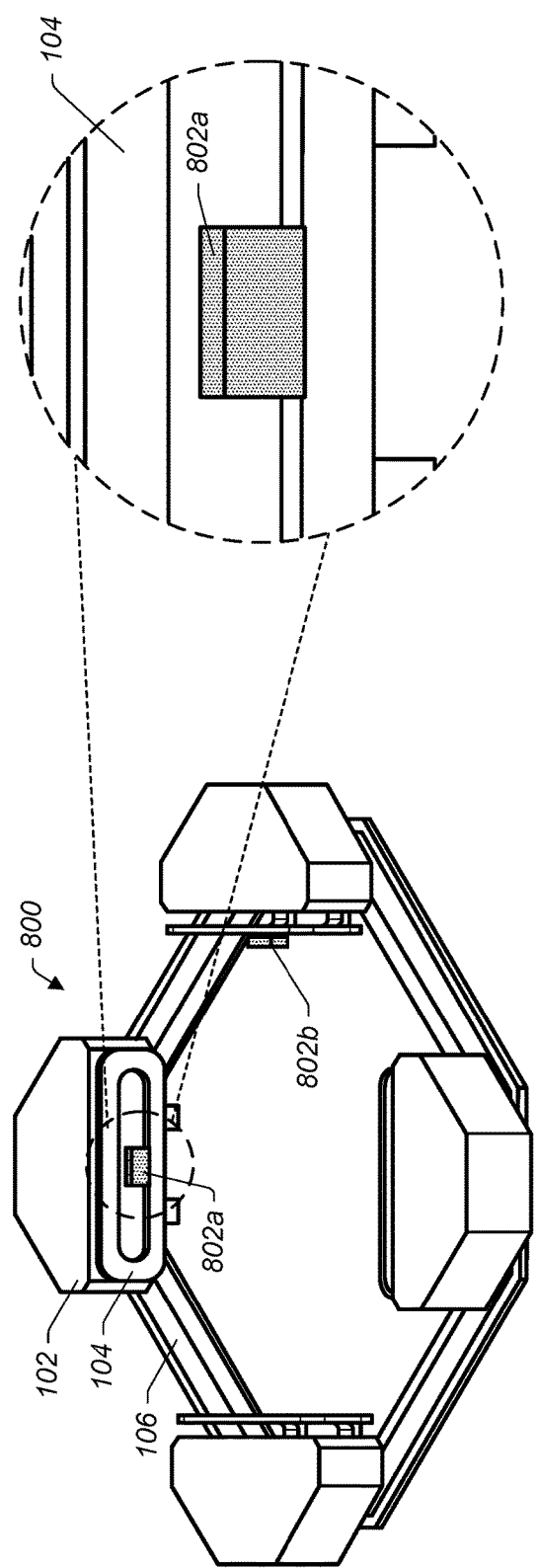
Figure 8B:
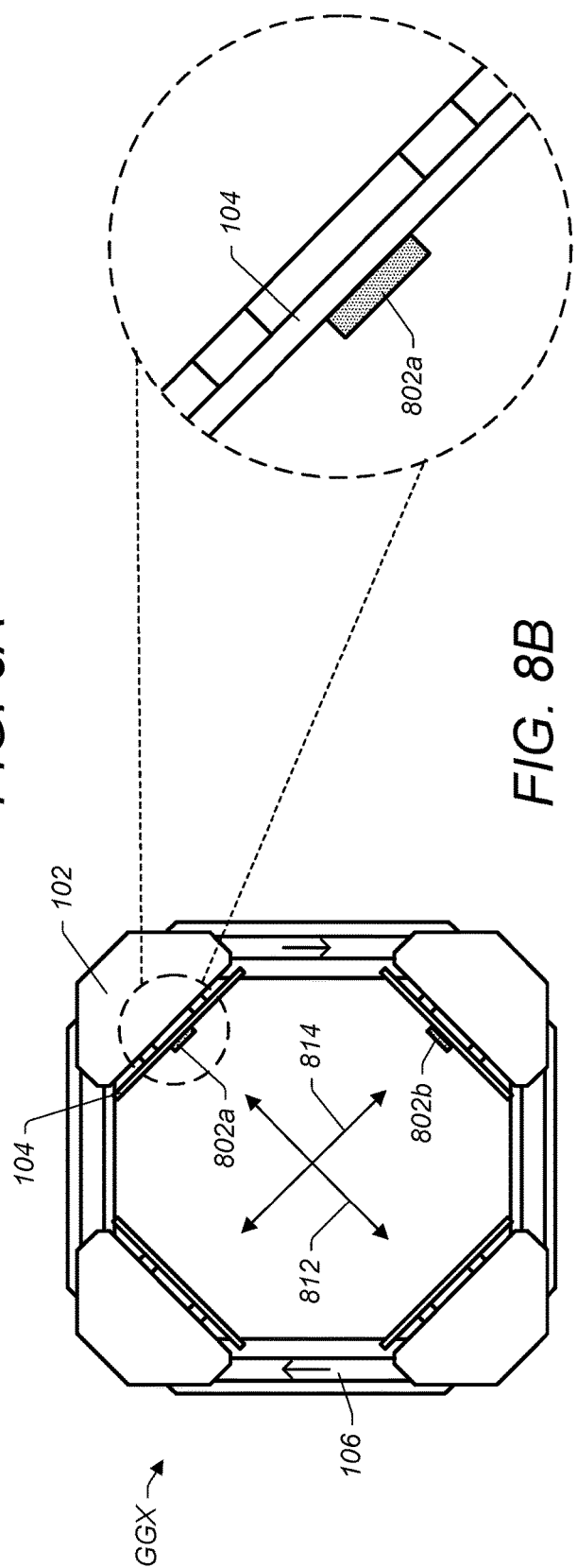

The magnet and coil arrangements of the voice coil motors described here may further comprise one or more position sensors for detecting the relative position of one or more coils (or coil-holding structures) within a camera module. FIGS. 8A-8C illustrate an example position sensing arrangement 800 that may be used to determine positioning of one or more components (e.g., of a camera that includes a voice coil motor (VCM) actuator for shifting an image sensor along multiple axes), in accordance with some embodiments. FIG. 8A shows a perspective view of the position sensing arrangement 800. FIG. 8B shows a top view of the position sensing arrangement 800. FIG. 8C shows a cross-sectional view of the position sensing arrangement 800 incorporated into a camera module 816. In some embodiments, the position sensing arrangement 800 may include one or multiple features, components, and/or functionality of embodiments described herein with reference to FIGS. 1A-7B and 9-15.

In some embodiments, the position sensing arrangement 800 may include one or more position sensors 802. In various examples, the position sensors 802 may be magnetic field sensors (e.g., Hall sensors, tunneling magnetoresistance (TMR) sensor, giant magnetoresistance (GMR) sensors, etc.). Each of the position sensors 802 may be attached to or otherwise located proximate a respective coil (e.g., an optical image stabilization (OIS) coil 104) and/or a respective magnet of a VCM actuator. The magnet and coil arrangement 100 is shown in FIGS. 8A-8C for the purpose of illustration, although it should be appreciated that the position sensing arrangement described here may be used with any of the magnet and coil arrangements discussed above. For instance, the position sensing arrangement 800 may include two position sensors 802—a first position sensor 802a and a second position sensor 802b. In various embodiments, when magnet and coil arrangement are incorporated into the camera module, the OIS coils 104 may be movable, and the magnets 102 may be stationary.

For OIS, the quantity being sensed may be the magnetic field produced by the magnet 102. For example, FIG. 8C indicates magnetic field lines 804 coming out of the magnet 102. The magnetic field may include a first magnetic field component in a first direction, e.g., as indicated by arrow 806. As the position sensor 802 moves along the first direction toward the magnet 102 or away from the magnet 102 (e.g., during OIS operations), the intensity of the first magnetic field component that is sensed by the position sensor 802 may change. For instance, as the position sensor 802 moves along the first direction 806 toward the magnet 102, the intensity of the first magnetic field component, as sensed by the position sensor 802, may increase. As the position sensor 802 moves along the first direction 806 away from the magnet 102, the intensity of the first magnetic field component, as sensed by the position sensor 802, may decrease.

For AF, the quantity being sensed may be an angle 808 between the first magnetic field component and a second magnetic field component of the magnetic field produced by the magnet 102. The magnet may produce the second magnetic field component in a second direction, e.g., as indicated by arrow 810. In some examples, the second direction may be orthogonal to the first direction. In some instances, the position sensor 802 may be centered with the magnet 102, e.g., centered along a z dimension of the magnet 102. In such instances, the second magnetic field component may be zero (to the position sensor 802). That is, in some embodiments, the position sensor 802 may sense the first magnetic field component but not the second magnetic field component in instances in which the position sensor 802 is centered with the magnet 102. As the position sensor 802 moves up or down along the second direction 810 (e.g., during AF operations), the second magnetic field component at the position sensor 802 location may changes, and thus the position sensor 802 may sense changes in the angle 808 between the first magnetic field component and the second magnetic field component.

In some variations, in order to sense the OIS movement and the AF movement, each of the first position sensor 802a and the second position sensor 802b may be configured to output two different signals, each of which responds primarily to motion in different directions across the range of motion of the coil arrangement (i.e., the range of motion that can be achieved during typical operation of the device). Specifically, when a given signal responds primarily to motion in a first direction, the sensitivity of the signal in response to movement across the range of motion in the first direction (in other words, the magnitude of signal change across the stroke in the first direction) should be greater than the sensitivity of the signal in response to movement across the respective range of motions in directions orthogonal to the first direction. The ratio of sensitivities to motion in a first direction relative to a second direction is referred to herein as a "cross-coupling ratio." When a signal described here responds primarily to motion in a primary direction, the cross-coupling ratios between a primary direction and directions orthogonal to the primary direction may be selected based on the sensitivity of the system, but it is generally desirable to set the cross-coupling ratio (sensitive in the orthogonal direction divided by sensitivity in the primary direction) to be as small as possible. For example, in some instances it may be desirable for the cross coupling ratio to be less than 0.25 (i.e., the signal is at least 4 times as sensitive in the primary direction than it is in an orthogonal direction), or more preferable less than 0.1 (i.e., as sensitive in the primary direction than it is in an orthogonal direction).

Each of the first position sensor 802a and the second position sensor 802b may output two signals, a first signal that responds primarily to motion in a first direction (e.g., the z direction) and a second signal that responds primarily to motion in a second direction orthogonal to the first direction (e.g., a direction in the x-y plane). For example, in the arrangement of FIGS. 8A-8C, the first position sensor 802a may output a first signal that primarily responds to motion in the z-direction (not shown) and second signal that primarily responds to motion in a first direction 812 in the x-y plane. The second position sensor 802b may output a first signal that primarily responds to motion in the z-direction and a second signal that primarily responds to motion in a second direction 814, the second direction 814 being in the x-y plane and perpendicular to the first direction 812. It should be noted that the first position sensor 802a and/or the second position sensor 802b may each comprise two or more discrete sensor elements that each may be positioned or otherwise configured to be sensitive primarily to magnetic field changes in a particular direction, and may collectively provide the first and second output signals for the respective position sensor.

The four signals (i.e., the first and second signals of the first position sensor 802a and the first and second signals of the second position sensor 802b) may be used to determine the position (and in some instances orientation) of the coil arrangement relative to the magnets 102 (and thus the rest of the camera). For example, the signals that respond primarily to movement in the z direction may be used to detect autofocus movement such as described in more detail above. In some instances, only one of the first and second position sensors may provide a signal that responds primarily to movement in the z direction, although instances where both position sensors output such a signal may increase reliability, as well as allow for the calculation of tilt of the coil arrangement in a given direction by measuring a difference between the signals. Additionally, the signals that respond primarily to movement in the first direction 812 and the second direction 814 may be used to detect OIS motion.

In some embodiments, the position sensing arrangement 800 may include a position sensor 802 for each pair of opposing magnets 102. In some examples, the first position sensor 802a may be attached to one OIS coil 104 of a pair of opposing OIS coils 104, and the second position sensor 802b may be attached to one OIS coil 104 of another pair of opposing OIS coils 104. As shown in FIGS. 8A and 8B, the position sensing arrangement 800 may include two position sensors 802, each of which may sense OIS movement in a respective direction. The first position sensor 802a may be used to sense OIS movement in a first direction, and the second position sensor 802b may be used to sense OIS movement in a second direction. In various embodiments, the second direction may be orthogonal to the first direction. Each of the position sensors 802 may be used to sense AF movement. Furthermore, the position sensors 802 may be used to sense tilt movement about at least one axis.

Although not shown in FIGS. 8A and 8B, the position sensing arrangement 800 may include a position sensor 802 for each magnet in some embodiments. In some examples, each of the position sensors 802 may be attached to a respective OIS coil. A first pair of position sensors 802 that correspond to a first pair of opposing magnets may be used to sense OIS movement in a first direction 812, and a second pair of position sensors 802 that correspond to a second pair of opposing magnets may be used to sense OIS movement in a second direction 814. In various embodiments, the second direction 814 may be orthogonal to the first direction 812. Each of the position sensors 802 may be used to sense AF movement. Furthermore, the first pair of position sensors 802 may be used to sense tilt movement about a first axis, and the second pair of position sensors 802 may be used to sense tilt movement about a second axis. In various embodiments, the second axis may be orthogonal to the first axis.

In some embodiments, the position sensing arrangement 800 may additionally, or alternatively, include one or more position sensors 802 underneath a substrate portion that carries the AF coil 106.

In various embodiments, the position sensors 802 of the position sensing arrangement 800 may sense magnetic field components of the drive magnets 102 as discussed above, without the need to include separate probe magnets for the position sensors 802 to sense.

In various embodiments, the position sensing arrangement 800 described herein may mitigate cross coupling sensed by the position sensors 802 during OIS and AF operations compared to some other position sensing arrangements.

One or more portions of the magnet and coil arrangements discussed above may be supported by a flexure arrangement that may help control relative movement between the magnets and coils. FIGS. 9A and 9B illustrate an example flexure arrangement 900 (e.g., for a camera that includes a voice coil motor (VCM) actuator for shifting an image sensor along multiple axes), in accordance with some embodiments. FIG. 9A shows a perspective view of the flexure arrangement 900. FIG. 9B shows a cross-sectional view of the flexure arrangement 900 in a camera 902 that includes a VCM actuator for shifting an image sensor along multiple axes. In some embodiments, the flexure assembly 900 may include one or multiple features, components, and/or functionality of embodiments described herein with reference to FIGS. 1A-8C and 10A-15. FIG. 9B show the camera 902 as comprising a position sensing arrangement 800 as described above with respect to FIGS. 8A-8C, although it should be appreciated that the camera 902 may incorporate any suitable position sensing system for monitoring the relative movement of the VCM actuator.

According to various embodiments, the camera 902 may include a lens 904, an image sensor 906, and a VCM actuator 908. The lens 904 may include one or more lens elements 908 that define an optical axis 910. The image sensor 906 may be configured to capture light passing through the lens 904 and convert the captured light into image signals. The path of light as it impinges on the image sensor 906 may be referred to as the optical axis 910. In various embodiments, the VCM actuator 908 may include the flexure arrangement 900, one or more magnets 912, one or more optical image stabilization (OIS) coils 914, one or more autofocus (AF) coils 916, and a coil carrier 918. The one or more magnets 912, one or more OIS coils, and one or more AF coils may have any suitable arrangement as discussed above, such as, for example, one of the arrangements described above with relation to FIGS. 1A-7B.

The magnets 912 and the coils 914, 916 may magnetically interact, e.g., to produce Lorentz forces that cause the coil carrier 918 to shift along multiple axes. For instance, the coil carrier 918 may move in directions orthogonal to the optical axis 910 (e.g., along the x-y plane) to provide OIS. Additionally, or alternatively, the coil carrier 918 may move along the optical axis 910 (e.g., along the z axis) to provide AF.

In various embodiments, the image sensor 906 may be configured to shift together with, and in a similar manner as, the coil carrier 918. In these embodiments, the one or more AF coils 916, the one or more OIS coils 914, and image sensor 906 may be held in a fixed relationship (referred to herein as the coil-sensor arrangement). The coil-sensor arrangement may be connected in any suitable manner, and the coil-sensor arrangement may comprise one or more holding structures for holding the coils and image sensor. For instance, the image sensor 906 may be attached to a substrate 920 of the camera 902 (and/or of the VCM actuator 908), and the substrate 920 may in turn be attached to the coil carrier 918 (either directly or via one or more intermediate structures). In variations where the AF coil 916 is a bottom AF coil (as shown in FIGS. 9A and 9B), the AF coil 916 (or a flex circuit holding the AF coil 916) may be directly connected to the substrate 920, which in some instances may allow for one or more electrical signals to be provided to one or more of the coils via electrical connections on the substrate 920. In some examples, the image sensor 906 may be attached to a bottom portion of the substrate 920. The substrate 920 may be attached to a bottom portion of the coil carrier 918 in some embodiments. Furthermore, the substrate 920 may be attached to a movable portion of the flexure arrangement 900, e.g., to the movable platform 928 discussed below. In other embodiments, the image sensor may be connected directly to the coil carrier. In some instances, the camera 902 may comprise one or more additional structures such as a bumper 950. The bumper 950 may be connected to a portion of the coil-sensor arrangement (e.g., an underside of the substrate 920), and may provide a stop for movement of the coil-sensor arrangement toward a bottom of the camera.

In various embodiments, the magnets 912 may be attached to a magnet holder 922. The magnet holder 922 may be a stationary component within the camera 902. As such, the magnets 912 may be stationary relative to one or more moving components of the camera 902.

In various embodiments, the OIS coils 914 and the AF coils 916 may be formed of a common coil structure, e.g., as described herein with reference to FIGS. 1A-1D and 12A-

12D. For instance, the coil structure may be formed of a flex circuit. In various embodiments, the coil structure may be manufactured as a flat coil structure with tab portions that are foldable, e.g., as described herein with reference to FIGS. 12A-12D. In some embodiments, the tab portions hold or include the OIS coils 914. Furthermore, the tab portions may extend from a base portion that holds or includes the AF coil(s) 916. In some cases, the base portion and/or the AF coil(s) 916 may form a ring around, or otherwise surround, the coil carrier 918 and/or the lens 904. The flex circuit may in turn be connected to the coil holder 918, such as discussed below with reference to FIGS. 12A-12D. As mentioned above, a portion of the flex circuit may also be connected to the substrate 920.

The flexure arrangement 900 may be configured to suspend the coil-sensor arrangement (or a coil-lens embodiment in instances where the coil arrangement moves the lens 904 within camera 902). In some embodiments, the flexure arrangement 900 may include a bottom flexure 924 and a top flexure 926. The bottom flexure 924 and the top flexure 926 may, in some cases, cooperatively provide compliance for movement (e.g., of the image sensor) in directions orthogonal to the optical axis 910 (e.g., for OIS) and/or along the optical axis 910 (e.g., for AF). According to various embodiments, the bottom flexure 924 and the top flexure 926 help guide motion of the substrate 920 (to which the image sensor 906 may be attached) and/or the image sensor 906 in a controlled manner. In some examples, the bottom flexure portion 924 may primarily provide guidance for OIS movement, and the top flexure portion 926 may primarily provide guidance for AF movement.

In some examples, the bottom flexure 924 may include a movable platform 928, a stationary platform 930, and one or more flexure arms 932 that connect the movable platform 928 to the stationary platform 930. The stationary platform 930 may be connected to a stationary component of the camera 902. For instance, the stationary platform 930 may be attached to a base 934 of the camera 902. In some embodiments, the substrate 920 may be attached to the movable portion 928 of the bottom flexure 924, and the image sensor 906 may be attached to the substrate 920. For example, in some variations moveable portion 928 may be connected to a bottom surface of the substrate 920. The substrate 920 and the image sensor 906 may move along with, and in the same manner as, the movable portion 928 of the bottom flexure 924 in some embodiments.

In some examples, the top flexure 926 may include a leaf portion 936 and a wire portion comprising one or more wires 938. The leaf portion 936 may be made of a sheet, which may be etched into a specific pattern. Generally, the leaf portion 936 may be suspended in the camera such that the leaf portion 936 (not flexed) is positioned within a plane that is perpendicular to the optical axis of the camera 902. Specifically, the one or more wires 938 of the may connect the leaf portion 936 to another portion of the camera 902 (e.g., a stationary portion of the camera) to suspend the leaf portion 936. In some embodiments, the leaf portion 936 may be attached to the top ends of the wires 938 and the bottom ends of the wires 938 may be attached to a stationary component 944 of the camera 902 (which may be any stationary portion of the camera 902) such that the leaf portion 936 is positioned above the wires 938. In other embodiments the bottom ends of the wires 938 are attached to the leaf portion 906 while the top ends of the wires 938 are attached to a stationary portion of the camera 902 such that the leaf portion is positioned below the wires 938. In still other embodiments, the leaf portion 906 may be attached to an intermediate portion of the wires 938 (i.e., near the middle of the wires). In these embodiments, one or both ends of each wire 938 may be connected to stationary portions of the camera. It should also be appreciated that different wires 938 may have different attachment approaches of those discussed above (e.g., the leaf portion 906 may be connected to the top end or ends of a first wire or group of wires and may be connected to the bottom end or ends of a second wire or group of wires). The wires 938 may be attached to the leaf portion 936 or stationary portions of the camera 902 any suitable manner, such as, for example, via solder 942.

The leaf portion 936 may be formed with any suitable cross-sectional pattern. In the embodiment shown in FIG. 9A, the leaf portion 936 may comprise a plurality of petals 937, each of which may connect to a different respective wire 938 of the wire portion. Each petal 937 may comprise two arms that branch from the connection with a respective wire 938, and connect to a portion of the coil-sensor (or coil-lens) arrangement, either directly or via an inside ring portion 946 discussed in more detail below. While shown in FIG. 9A as having two branching arms, it should be appreciated that a petal may have any suitable number of arms (e.g., one, two, or three or more) connecting the respective wire 938 to the coil-sensor arrangement. Additionally, while shown in FIG. 9A as having four petals each forming an irregular pentagon shape, the leaf portion 936 may have any suitable number of petals (e.g., two, three, four, or five or more) and may have either all petals having the same shape or different petals having different shapes. Suitable shapes include, but are not limited to semicircles, triangles, irregular polygons and the lie.

In some embodiments, the leaf portion 936 of the top flexure 926 may include an inside ring portion 946. The inside ring portion 946 may be connected to a top portion or surround an exterior portion of the coil carrier 918. While the inside ring portion 946 is shown in FIG. 9A as fully circumscribing the optical axis of the camera 902, it should be appreciated that the leaf portion 936 may only partially surround the optical axis of the camera 902. Indeed, in some variations the leaf portion 936 may comprise a plurality of separate pieces that are individually and independently attached to the coil-sensor arrangement. For example, in some variations each petal of leaf portion 936 may be formed from a separate piece and may be separately connected to the coil-sensor arrangement.

Collectively the top flexure 926 and bottom flexure 924 may suspend the coil-sensor arrangement relative to the rest of the camera 902. For example, the top flexure 926 may be connected to the coil carrier 918 while the bottom flexure 924 may be connected to the substrate 920 to which the image sensor 906 may be connected. The substrate 920 may be connected to the coil carrier 918. The coil carrier 918 may bridge the top flexure 926 with the bottom flexure 924 in some embodiments.

In various embodiments, the top flexure 926 and/or bottom flexure 924 may advantageously be used to route one or more signals to or from the coil-sensor arrangement, but need not (e.g., one or more flex circuits may carry traces between the coil-sensor arrangement and a stationary portion of the camera). For example, image sensor data from the image sensor may be routed from the coil-sensor arrangement to other processing circuitry elsewhere in the camera or a device into which the camera is incorporated. Additionally, power and other signals used to drive the AF and OIS coils may be routed to the coil-sensor arrangement. For example, signals from the image sensor may be conveyed to the substrate 920, which in turn may be conveyed to the flexure arrangement. For example, one or more signals may be routed via traces on one or more of the flexures arms 932. As an example, image signals may be conveyed from the substrate 920 to the movable platform 928, and from the movable platform 928 to the stationary platform 930 via electrical traces on the flexure arms 932. Not every flexure arm 932 need have a trace depending on the number of traces needed, and a given flexure arm 932 may have a single or multiple traces. Additionally or alternatively, top flexure 926 may carry one or more signals. In these variations, a wire 938 of the wire portion may be conductive or otherwise carry a conductive trace, which in turn may be connected to a conductive portion of the leaf portion 936 (e.g., the leaf portion may be formed from a conductive material and/or may have a conductive trace deposited thereon), which in turn may be connected to and route signals via a portion of the coil-sensor arrangement (e.g., a conductive portion of the coil carrier 918).

It should be appreciated that electrical signals within the coil-signal arrangement may be routed in any suitable manner. For example, the substrate 920 may provide one or more electrical pathways for connecting the image sensor to traces on the bottom flexure. Additionally or alternatively, the substrate 920 may comprise one or more electrical pathways that connect a flex circuit of the coil arrangement to one or more traces on the bottom flexure (which may allow for signals to be passed to one or more of the coils via the flex circuit). Additionally or alternatively the substrate 920 may comprise one or more electrical pathways that electrically connect one or more traces on the bottom flexure to a coil carrier 918 (which in turn may be used to route signals to one or more coils such as described in more detail below). Similarly the coil carrier 918 may comprise one or more electrical pathways for connecting the top flexure to other components (e.g., one or more coils, the image sensor, or one or more additional electrical components supported by the coil-sensor arrangement).

In some cases, the lens 904 may be held by a lens holder 946. The lens 904 and/or the lens holder 946 may be connected to a stationary component of the camera 902 such that the lens 904 may be fixed relative to moving components of the camera 902. For instance, the lens 904 and/or the lens holder 946 may be connected to the shield can 940, the magnet holder 922, and/or the substrate 920 (which may be connected to the shield can 940).

In some embodiments, the bottom flexure 924 may include one or more flexure stabilizers 948 to stabilize movement of the flexure arms 932. For instance, the flexure stabilizers 948 may prevent the flexure arms 932 from colliding or otherwise interfering with one another.

Figure 10A:
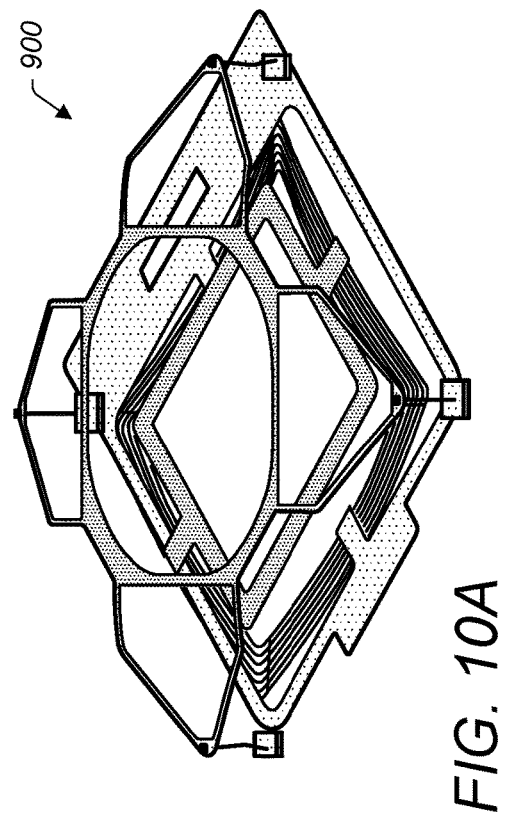
FIGS. 10A-10C illustrate example compliance provided by the example flexure arrangement of FIGS. 9A and 9B in response to different types of motion, in accordance with some embodiments. In various embodiments, the flexure arrangement may help guide motion of a substrate (to which an image sensor may be attached) and/or the image sensor in a controlled manner.
Figure 10B:
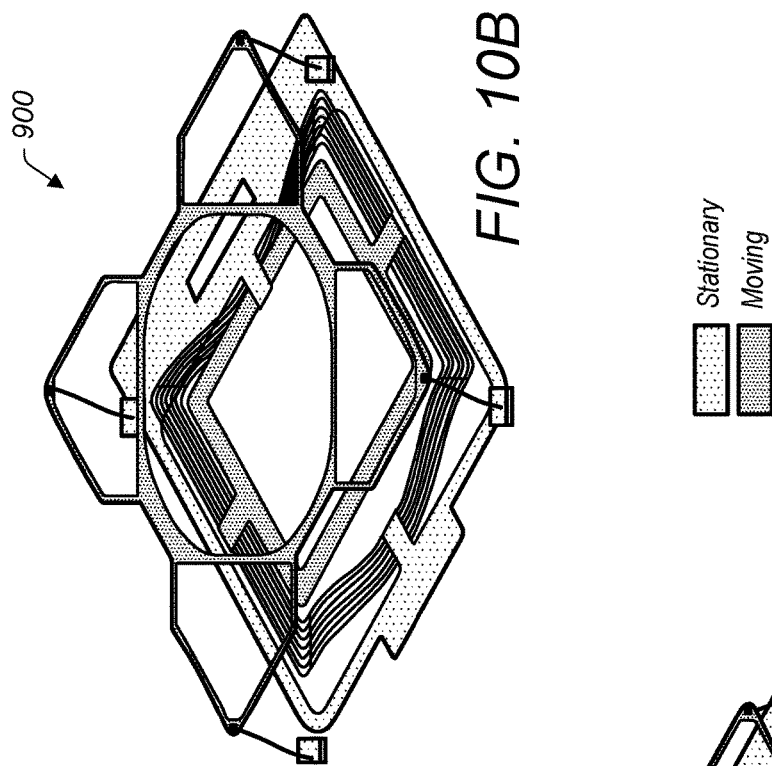
Figure 10C:
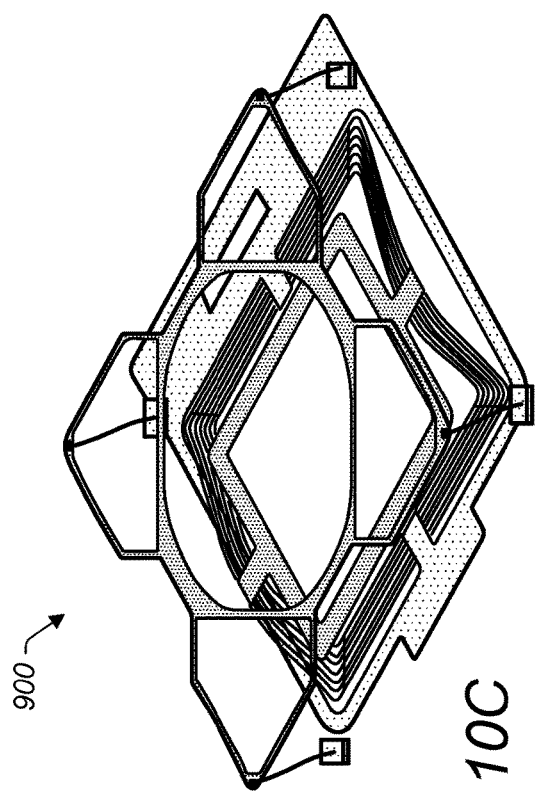

FIGS. 10A-10C illustrate example compliance provided by the example flexure arrangement 900 of FIGS. 9A and 9B in response to different types of motion, in accordance with some embodiments. FIG. 10A shows an example of how the flexure arrangement 900 may move in response to autofocus (AF) motion. During AF motion, as the coil-sensor arrangement (not shown) moves up or down in the z-direction, some or all of the flexure arms 932 of the bottom flexure 924 may flex in the z-direction and one or more segments of the leaf portion 936 (e.g., the petals 937) may flex in the z-direction. FIG. 10B shows an example of how the flexure arrangement 900 may move in response to optical image stabilization (OIS) motion in a first direction. FIG. 10C shows an example of how the flexure arrangement 900 may move in response to OIS motion in a second direction that is opposite the first direction. During OIS motion while the coil-sensor arrangement (not shown) moves in the x-y plane, some or all of the flexure arms 932 of the bottom flexure 924 will flex in the x-y plane, while the wires 938 of the top flexure will flex in the direction that the coil-sensor arrangement moves. Generally the leaf portion 936 is stiffer than the wires 938 in the x and y directions while the wires 938 are stiffer than the leaf portion 936 in the z direction, which is why the leaf portion 936 will primarily flex during the AF movement and the wires 938 will primarily flex during the OIS movement. The relative flexibility of the components of the top and bottom flexures may be selected to provide different levels of support/resistance to movement in different directions. In some embodiments, the examples of compliance provided by the example flexure arrangement 900 may include one or multiple features, components, and/or functionality of embodiments described herein with reference to FIGS. 1A-9B and 11A-15.

Figure 11A:
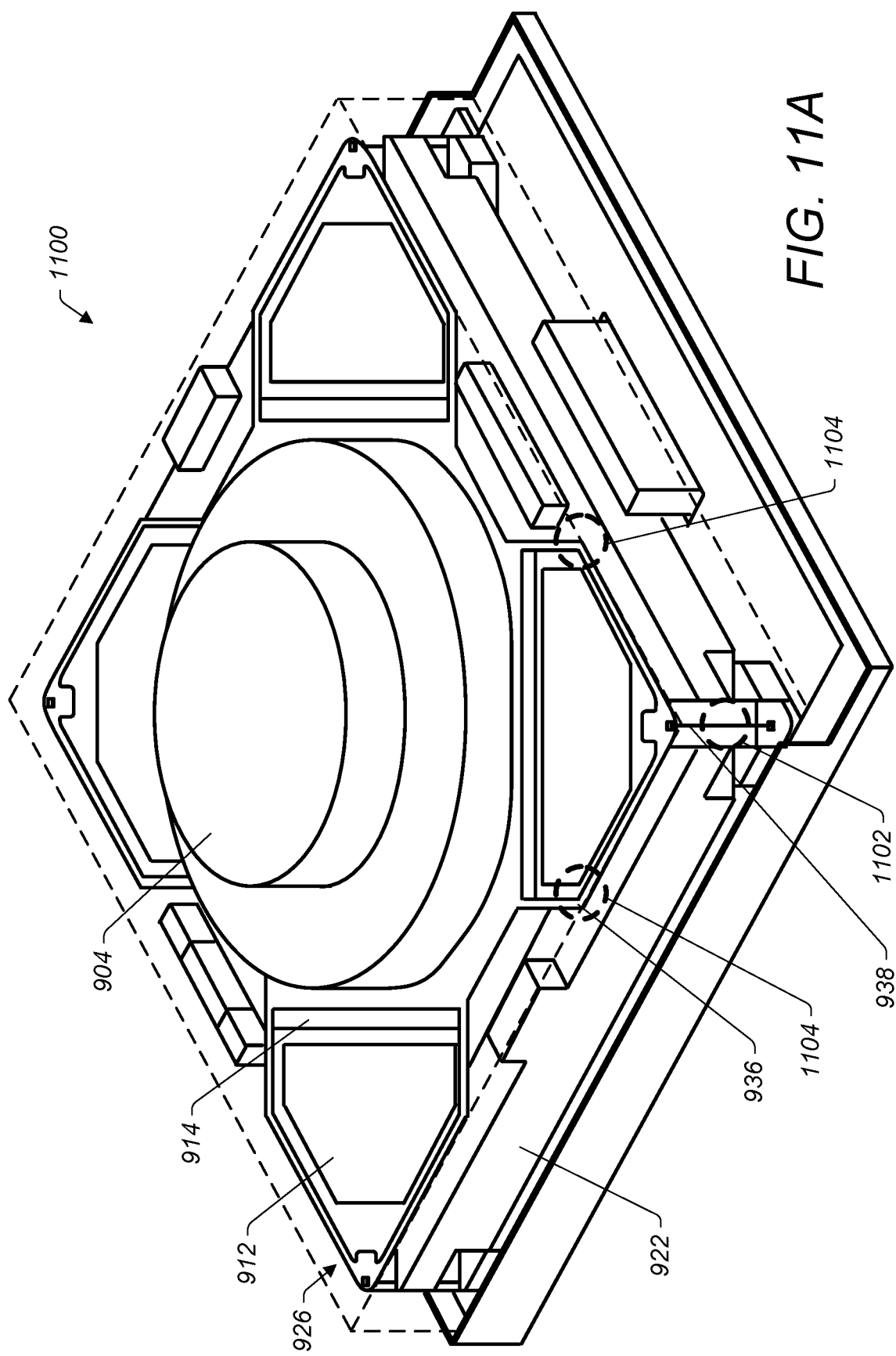
FIGS. 11A and 11B illustrate perspective views of an example camera and example locations within for placement of a viscoelastic material within the camera for damping purposes, in accordance with some embodiments. In various embodiments, the camera may include a VCM actuator for shifting an image sensor along multiple axes), in accordance with some embodiments.
Figure 11B:
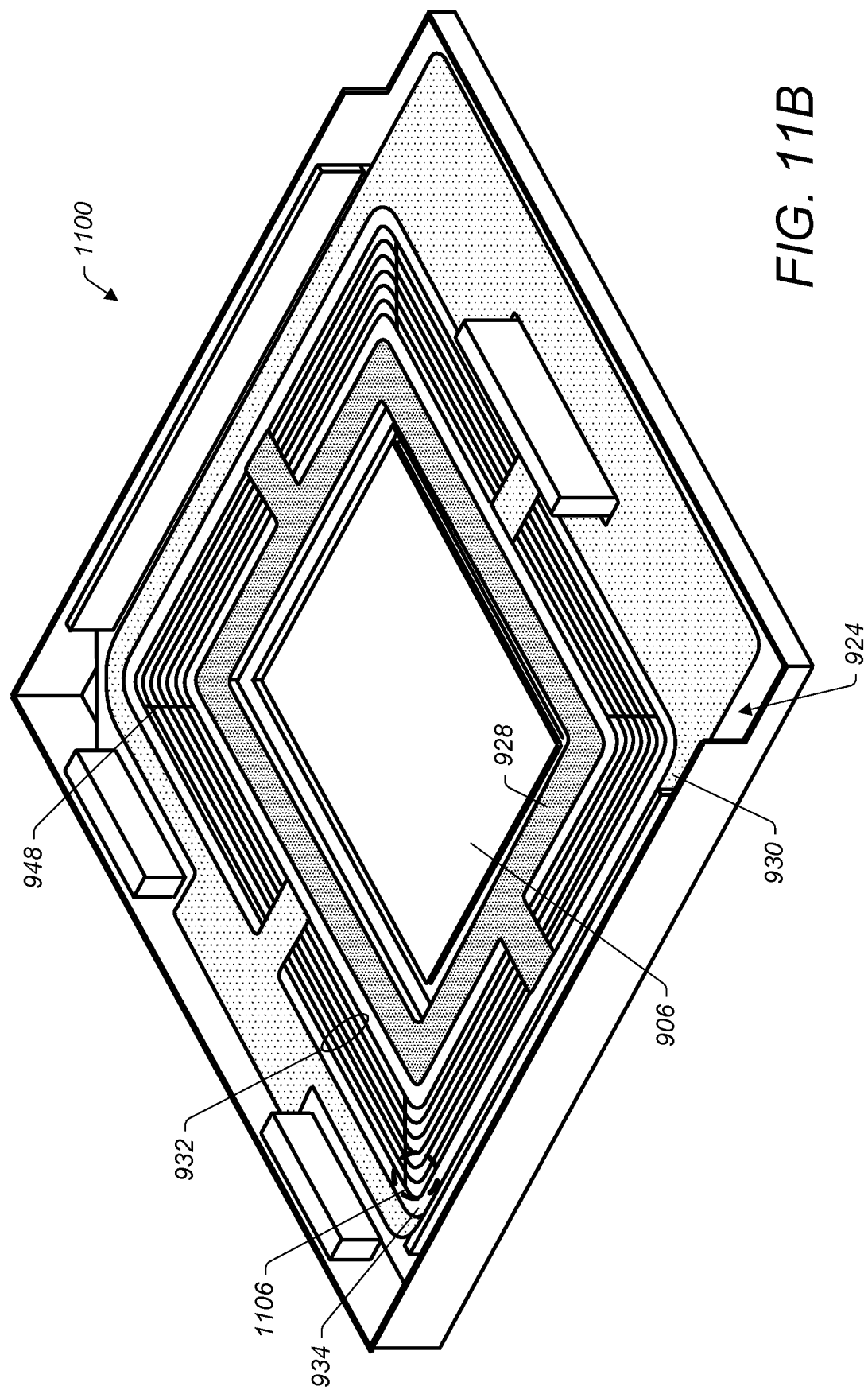

In some variations, the camera may be configured to damp movement of one or both of the top and bottom flexures of the flexure arrangements described here. FIGS. 11A and 11B illustrate perspective views of an example camera 1100 and example locations within for placement of a viscoelastic material (e.g., a gel) within the camera 1100 for damping purposes, in accordance with some embodiments. In various embodiments, the camera 1100 may include a voice coil motor (VCM) actuator for shifting an image sensor along multiple axes), in accordance with some embodiments. In some embodiments, the example locations and/or the camera 1100 may include one or multiple features, components, and/or functionality of embodiments described herein with reference to FIGS. 1A-10C and 12A-15. Various components described above with respect to FIGS. 9A and 9B are shown in these figures, and are labeled accordingly.

FIG. 11A shows a first set of one or more locations 1102 and a second set of one or more locations 1104 for placement of the viscoelastic material for damping. In some embodiments, the first set of locations 1102 may be between a magnet holder 922 (or other stationary portion of the camera 1100) and a wire 938 (which may move) of a wire portion of the top flexure 926. In some examples, the second set of locations 1104 may be between the magnet holder 922 (or other stationary portion of the camera 1100) and a leaf portion 936 (which may move) of the top flexure 926.

FIG. 11B shows a third set of one or more locations 1106 for placement of the viscoelastic material for damping. In some embodiments, the third set of locations 1106 may be between flexure arms 932 (which may move) of the bottom flexure 924 and a base component 934 (which may be stationary). It should be understood, however, that in various embodiments the viscoelastic material may additionally or alternatively be placed in other locations between moving and stationary components for damping purposes.

While flexure arrangement 900 has been discussed as configured to suspend a coil and image sensor arrangement, in other embodiments a flexure arrangement including any or all the features described herein and shown in FIGS. 9A-B, 10A-C and 11A-B may be configured to suspend a coil-lens assembly (e.g., in instances where the coil arrangement moves lens 904 within camera 902). Modifications as would be evident having benefit of this disclosure may be needed in regard to the shape, size, thickness, etc. of certain features of the flexure arrangement in embodiments in which the flexure arrangement is configured to suspend a lens or lens stack within a camera.

Figure 12A:
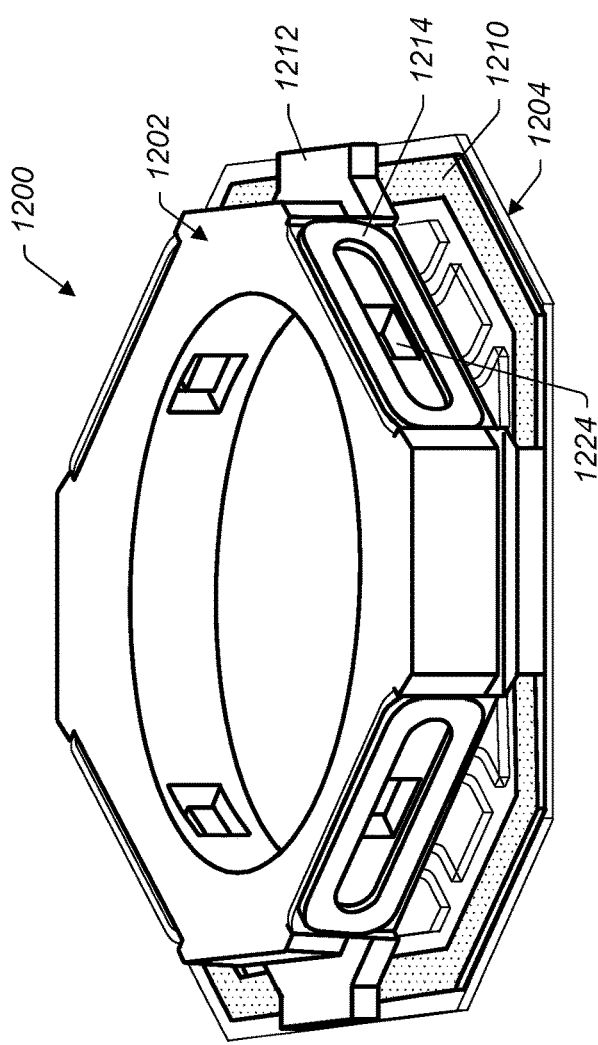
FIG. 12A illustrates a perspective view of an example coil structure and coil carrier assembly, in accordance with some embodiments.
Figure 12B:
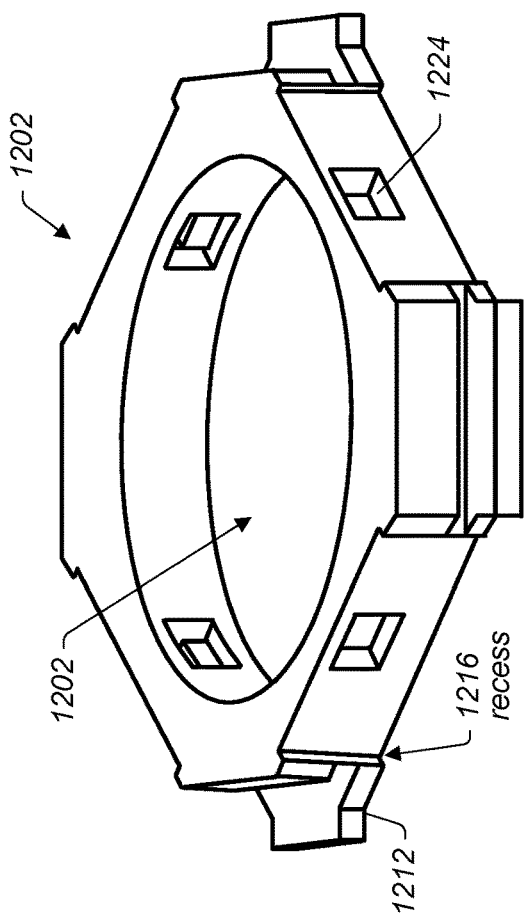
FIG. 12B illustrates a perspective view of an example coil carrier, in accordance with some embodiments.

FIG. 12A illustrates a perspective view of an example coil assembly 1200 by which one or more optical image stabilization coils and one or more autofocus coils may be held in a fixed relationship, in accordance with some embodiments. FIG. 12B illustrates a perspective view of an example coil carrier 1202, in accordance with some embodiments. FIGS. 12C and 12D illustrate perspective views of an example coil structure 1204, in accordance with some embodiments. In some embodiments, the coil structure and coil carrier assembly 1200, the coil carrier 1202, and/or the coil structure 1204 may be used in conjunction with one or more of embodiments described herein with reference to FIGS. 1A-11B and 13-15.

In some embodiments, the coil assembly 1200 may include the coil carrier 1202 and the coil structure 1204. The coil carrier 1202 comprises a body that may hold and support the coil structure 1204, and may provide a connection point for the coil assembly 1200 to other components of the camera (e.g., the top and/or bottom flexure of a flexure arrangement, and/or a substrate, such as those described above in relation to FIGS. 9A and 9B). The coil carrier 1202 may be formed from a single monolithic piece of material, or may be assembled from a plurality of discrete pieces. In some embodiments the coil carrier 1202 may comprise one or more traces or electrical interconnects, which may be used to route electrical signals (e.g., drive signals for the coils) to coil structure 1204 or other components in the camera. According to some embodiments, the coil carrier 1202 may be configured to surround at least a portion of a lens and/or a lens holder of a camera. For example, coil carrier 1202 may define an aperture 1228 extending through the coil carrier 1202. When the coil carrier 1202 is incorporated into a coil-sensor arrangement of a camera, as discussed in more detail above, the coil carrier 1202 may be positioned such that light to be captured by the camera needs to pass through the aperture to reach and be measured by the image sensor. The coil carrier may be further positioned within the camera such that at least a portion of a lens and/or a lens holder of a camera extends at least partially through the aperture.

Turning to FIGS. 12C and 12D, in various embodiments, the coil structure 1204 may include a base portion 1206 and one or more tab portions 1208. The base portion 1206 may define an aperture 1230 extending at least partially therethrough, and that may allow light to pass through the coil structure 1204 to reach the image sensor (in instances where the image sensor is positioned beneath the base portion 1206. The base portion 1206 may include one or more autofocus (AF) coils 1210. In some embodiments, the base portion 1206 may include a single AF coil 1210, e.g., as shown in FIGS. 12A-12C. In some examples, the base portion 1206 and the AF coil 1210 may be ring shaped. Furthermore, in some examples, the base portion 1206 and/or the AF coil 1210 may be attached to a bottom portion of the coil carrier 1202 in some embodiments. In some embodiments, the coil carrier 1202 may include one or more protrusions 1212 to which the base portion 1206 and/or the AF coil 1210 may be attached. In some of these embodiments, one or more the protrusions 1212 may be used to route electrical signals to the AF coil 1210 and/or the OIS coils.

In some embodiments, each of the tab portions 1208 may include a respective optical image stabilization (OIS) coil 1214. The tab portions 1208 may extend from the base portion 1206. In some embodiments (such as the one shown in FIGS. 12C and 12D), one or more of the tab portions 1208 may extend from an interior of the base portion 1206, which may in turn be used to create a magnet and coil arrangement having inner OIS coils (such as those embodiments discussed above with respect to FIGS. 2A-5B). In these instances, a given OIS coil may be positioned between a magnet and the coil carrier 1202. In other variations, one or more of the tab portions may extend from an exterior of the base portion 1206, which may be used to create a magnet and coil arrangement having outer OIS coils (such as those embodiments discussed above with respect to FIGS. 6A-7B). In these variations, a given OIS coil may have a magnet positioned between the OIS coil and the coil carrier 1202.

In some embodiments of the coil assembly 1200, one or more OIS coils 1214 may be attached to and/or located proximate one or more outer surfaces of the coil carrier 1202. When an OIS coil is attached to an outer surface of the coil carrier 1202, this attachment may also provide an electrical connection between the coil carrier 1202 and the OIS coil 1214. In some examples, the coil carrier 1202 may include one or more recesses 1216 within which at least a portion of the OIS coils 1214 may be located.

In various embodiments, the coil structure 1204 may be constructed of a single flat circuit, e.g., as illustrated in FIG. 12C. For instance, the AF coil 1210, the OIS coils 1214, and/or other components may be formed on a substrate 1218 in an additive deposition process to produce a flat circuit in some embodiments.

In some examples, the tab portions 1208 of the coil structure 1204 may include fold portions 1220 at which the tab portions 1208 may be folded to orient the OIS coils 1214 at an angle relative to the AF coil 1210, e.g., as shown in FIG. 12D. In some embodiments, the OIS coils 1214 may be oriented vertically and the AF coil 1210 may be oriented horizontally. Each of the OIS coils 1214 may define a respective plane that is orthogonal to a plane defined by the AF coil 1210.

In variations where a coil arrangement 1200 comprises one or more position sensor 1222 (e.g., the position sensors 802 discussed herein with reference to FIGS. 8A-8C), the position sensor may be attached to either the coil structure 1204 or the coil carrier 1202. For example, in some variations, the position sensors may be mounted to a portion of the coil structure 1204, such as the circuit substrate on which the coils are built. For example, a small finger of substrate material 1218 may extend into the center region of one or more of the coils, such as shown at 1222. One or more of the position sensors may be mounted to the finger(s) 1222 of coil structure 1204, and signals to and/or from the position sensors may be routed through the circuit substrate material of coil structure 1204. In some of these embodiments, the coil carrier 1202 may include one or more recesses and/or windows 1224. In some embodiments, a position sensor may be located at least partially within a window 1224 to save space in the x and/or y dimensions of a camera that includes the coil structure and coil carrier assembly 1200. In other instances, one or more position sensors may be connected directly to the coil carrier 1202 (e.g., within a window or recess) and the coil carrier 1202 may include one or more electrical traces for carrying signals to and/or from the position sensor.

Figure 13:
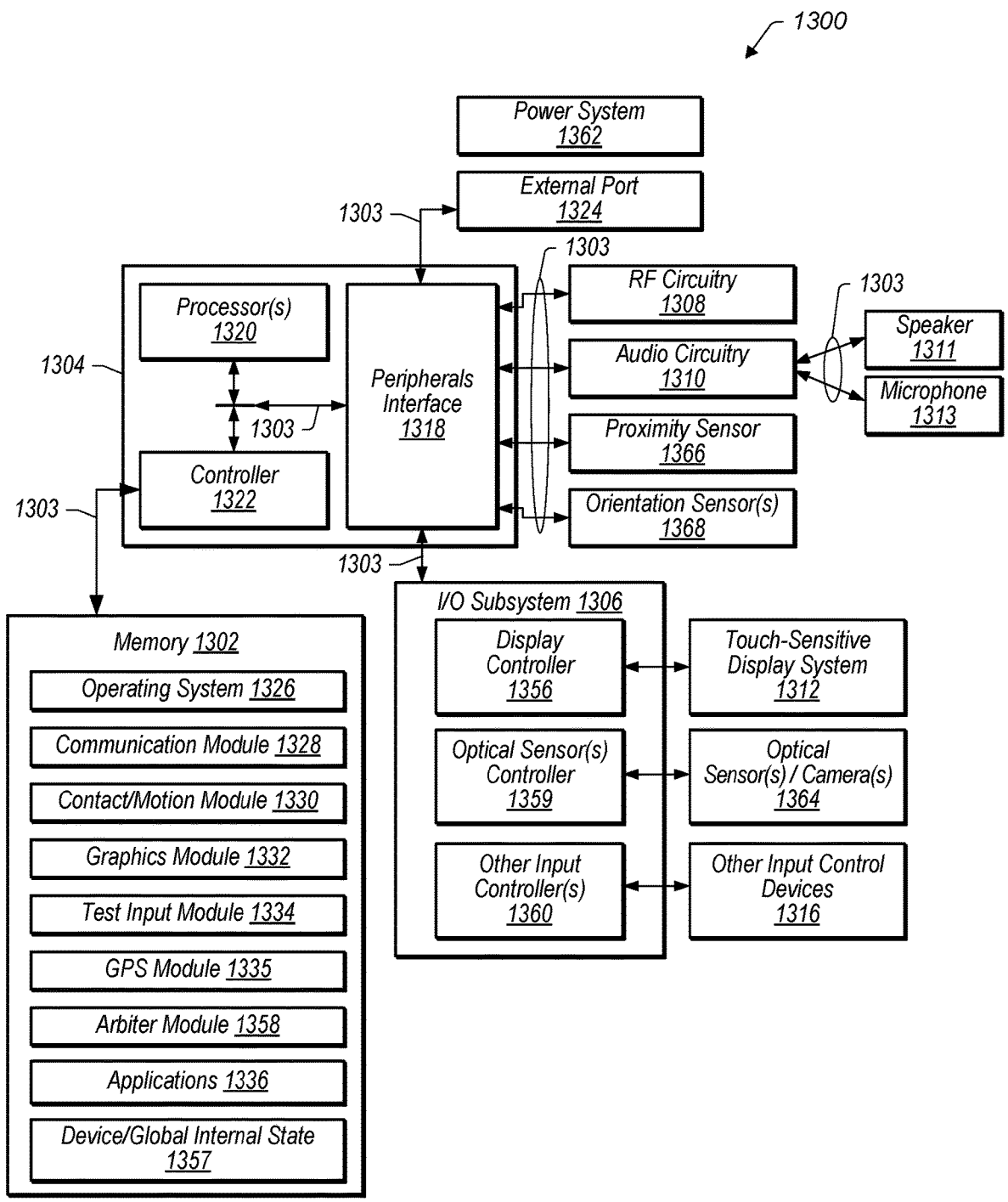
FIG. 13 illustrates a block diagram of a portable multifunction device that may include a camera, in accordance with some embodiments.

FIG. 13 illustrates a block diagram of an example portable multifunction device 1300 that may include one or more cameras, in accordance with some embodiments. In some embodiments, at least one camera of the portable multifunction device 1300 may include one or multiple features, components, and/or functionality of embodiments described herein with reference to FIGS. 1A-12D, 14, and 15.

Camera(s) 1364 is sometimes called an "optical sensor" for convenience, and may also be known as or called an optical sensor system. Device 1300 may include memory

1302 (which may include one or more computer readable storage mediums), memory controller 1322, one or more processing units (CPUs) 1320, peripherals interface 1318, RF circuitry 1308, audio circuitry 1310, speaker 1311, touch-sensitive display system 1312, microphone 1313, input/output (I/O) subsystem 1306, other input or control devices 1316, and external port 1324. Device 1300 may include one or more optical sensors 1364. These components may communicate over one or more communication buses or signal lines 1303.

It should be appreciated that device 1300 is only one example of a portable multifunction device, and that device 1300 may have more or fewer components than shown, may combine two or more components, or may have a different configuration or arrangement of the components. The various components shown in FIG. 13 may be implemented in hardware, software, or a combination of hardware and software, including one or more signal processing and/or application specific integrated circuits.

Memory 1302 may include high-speed random access memory and may also include non-volatile memory, such as one or more magnetic disk storage devices, flash memory devices, or other non-volatile solid-state memory devices. Access to memory 1302 by other components of device 1300, such as CPU 1320 and the peripherals interface 1318, may be controlled by memory controller 1322.

Peripherals interface 1318 can be used to couple input and output peripherals of the device to CPU 1320 and memory 1302. The one or more processors 1320 run or execute various software programs and/or sets of instructions stored in memory 1302 to perform various functions for device 1300 and to process data.

In some embodiments, peripherals interface 1318, CPU 1320, and memory controller 1322 may be implemented on a single chip, such as chip 1304. In some other embodiments, they may be implemented on separate chips.

RF (radio frequency) circuitry 1308 receives and sends RF signals, also called electromagnetic signals. RF circuitry 1308 converts electrical signals to/from electromagnetic signals and communicates with communications networks and other communications devices via the electromagnetic signals. RF circuitry 1308 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 1308 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a variety of communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 1310, speaker 1311, and microphone 1313 provide an audio interface between a user and device 1300. Audio circuitry 1310 receives audio data from peripherals interface 1318, converts the audio data to an electrical signal, and transmits the electrical signal to speaker 1311. Speaker 1311 converts the electrical signal to human-audible sound waves. Audio circuitry 1310 also receives electrical signals converted by microphone 1313 from sound waves. Audio circuitry 1310 converts the electrical signal to audio data and transmits the audio data to peripherals interface 1318 for processing. Audio data may be retrieved from and/or transmitted to memory 1302 and/or RF circuitry 1308 by peripherals interface 1318. In some embodiments, audio circuitry 1310 also includes a headset jack (e.g., 1412, FIG. 14). The headset jack provides an interface between audio circuitry 1310 and removable audio input/output peripherals, such as output-only headphones or a headset with both output (e.g., a headphone for one or both ears) and input (e.g., a microphone).

I/O subsystem 1306 couples input/output peripherals on device 1300, such as touch screen 1312 and other input control devices 1316, to peripherals interface 1318. I/O subsystem 1306 may include display controller 1356 and one or more input controllers 1360 for other input or control devices. The one or more input controllers 1360 receive/send electrical signals from/to other input or control devices 1316. The other input control devices 1316 may include physical buttons (e.g., push buttons, rocker buttons, etc.), dials, slider switches, joysticks, click wheels, and so forth. In some alternate embodiments, input controller(s) 1360 may be coupled to any (or none) of the following: a keyboard, infrared port, USB port, and a pointer device such as a mouse. The one or more buttons (e.g., 1408, FIG. 14) may include an up/down button for volume control of speaker 1311 and/or microphone 1313. The one or more buttons may include a push button (e.g., 1406, FIG. 14).

Touch-sensitive display 1312 provides an input interface and an output interface between the device and a user. Display controller 1356 receives and/or sends electrical signals from/to touch screen 1312. Touch screen 1312 displays visual output to the user. The visual output may include graphics, text, icons, video, and any combination thereof (collectively termed "graphics"). In some embodiments, some or all of the visual output may correspond to user-interface objects.

Touch screen 1312 has a touch-sensitive surface, sensor or set of sensors that accepts input from the user based on haptic and/or tactile contact. Touch screen 1312 and display controller 1356 (along with any associated modules and/or sets of instructions in memory 1302) detect contact (and any movement or breaking of the contact) on touch screen 1312 and converts the detected contact into interaction with user-interface objects (e.g., one or more soft keys, icons, web pages or images) that are displayed on touch screen 1312. In an example embodiment, a point of contact between touch screen 1312 and the user corresponds to a finger of the user.

Touch screen 1312 may use LCD (liquid crystal display) technology, LPD (light emitting polymer display) technology, or LED (light emitting diode) technology, although other display technologies may be used in other embodiments. Touch screen 1312 and display controller 1356 may detect contact and any movement or breaking thereof using any of a variety of touch sensing technologies now known or later developed, including but not limited to capacitive, resistive, infrared, and surface acoustic wave technologies, as well as other proximity sensor arrays or other elements for determining one or more points of contact with touch screen 1312. In an example embodiment, projected mutual capacitance sensing technology is used.

Touch screen 1312 may have a video resolution in excess of 800 dpi. In some embodiments, the touch screen has a video resolution of approximately 860 dpi. The user may make contact with touch screen 1312 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 1300 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 1312 or an extension of the touch-sensitive surface formed by the touch screen.

Device 1300 also includes power system 1362 for powering the various components. Power system 1362 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 1300 may also include one or more optical sensors or cameras 1364. FIG. 13 shows an optical sensor 1364 coupled to optical sensor controller 1359 in I/O subsystem 1306. Optical sensor 1364 may include charge-coupled device (CCD) or complementary metal-oxide semiconductor (CMOS) phototransistors. Optical sensor 1364 receives light from the environment, projected through one or more lens, and converts the light to data representing an image. In conjunction with imaging module 1343 (also called a camera module), optical sensor 1364 may capture still images or video. In some embodiments, an optical sensor 1364 is located on the back of device 1300, opposite touch screen display 1312 on the front of the device, so that the touch screen display 1312 may be used as a viewfinder for still and/or video image acquisition. In some embodiments, another optical sensor is located on the front of the device so that the user's image may be obtained for videoconferencing while the user views the other video conference participants on the touch screen display. At least one, several, or all cameras 1364 of the portable multifunction device 1300 may include one or multiple features, components, and/or functionality of embodiments described herein with reference to FIGS. 1A-12D, 14, and 15.

Device 1300 may also include one or more proximity sensors 1366. FIG. 13 shows proximity sensor 1366 coupled to peripherals interface 1318. Alternately, proximity sensor 1366 may be coupled to input controller 1360 in I/O subsystem 1306. In some embodiments, the proximity sensor 1366 turns off and disables touch screen 1312 when the multifunction device 1300 is placed near the user's ear (e.g., when the user is making a phone call).

Device 1300 includes one or more orientation sensors 1368. In some embodiments, the one or more orientation sensors 1368 include one or more accelerometers (e.g., one or more linear accelerometers and/or one or more rotational accelerometers). In some embodiments, the one or more orientation sensors 1368 include one or more gyroscopes. In some embodiments, the one or more orientation sensors 1368 include one or more magnetometers. In some embodiments, the one or more orientation sensors 1368 include one or more of global positioning system (GPS), Global Navigation Satellite System (GLONASS), and/or other global navigation system receivers. The GPS, GLONASS, and/or other global navigation system receivers may be used for obtaining information concerning the location and orientation (e.g., portrait or landscape) of device 1300. In some embodiments, the one or more orientation sensors 1368 include any combination of orientation/rotation sensors. FIG. 13 shows the one or more orientation sensors 1368 coupled to peripherals interface 1318. Alternately, the one or more orientation sensors 1368 may be coupled to an input controller 1360 in I/O subsystem 1306. In some embodiments, information is displayed on the touch screen display 1312 in a portrait view or a landscape view based on an analysis of data received from the one or more orientation sensors 1368.

In some embodiments, the software components stored in memory 1302 include operating system 1326, communication module (or set of instructions) 1328, contact/motion module (or set of instructions) 1330, graphics module (or set of instructions) 1332, text input module (or set of instructions) 1334, Global Positioning System (GPS) module (or set of instructions) 1335, arbiter module 1358 and applications (or sets of instructions) 1336. Furthermore, in some embodiments memory 1302 stores device/global internal state 1357. Device/global internal state 1357 includes one or more of: active application state, indicating which applications, if any, are currently active; display state, indicating what applications, views or other information occupy various regions of touch screen display 1312; sensor state, including information obtained from the device's various sensors and input control devices 1316; and location information concerning the device's location and/or attitude.

Operating system 1326 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 1328 facilitates communication with other devices over one or more external ports 1324 and also includes various software components for handling data received by RF circuitry 1308 and/or external port 1324. External port 1324 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector.

Contact/motion module 1330 may detect contact with touch screen 1312 (in conjunction with display controller 1356) and other touch sensitive devices (e.g., a touchpad or physical click wheel). In some embodiments, contact/motion module 1330 and display controller 1356 detect contact on a touchpad. Contact/motion module 1330 may detect a gesture input by a user. Different gestures on the touch-sensitive surface have different contact patterns. Graphics module 1332 includes various known software components for rendering and displaying graphics on touch screen 1312 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like. Text input module 1334, which may be a component of graphics module 1332, provides soft keyboards for entering text in various applications (e.g., contacts, e-mail, and any other application that needs text input). GPS module 1335 determines the location of the device and provides this information for use in various applications 1336 (e.g., to a camera application as picture/video metadata).

Applications 1336 may include one or more modules (e.g., a contacts module, an email client module, a camera module for still and/or video images, etc.) Examples of other applications 1336 that may be stored in memory 1302 include other word processing applications, other image editing applications, drawing applications, presentation applications, JAVA-enabled applications, encryption, digital rights management, voice recognition, and voice replication. Each of the modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. In some embodiments, memory 1302 may store a subset of the modules and data structures identified above. Furthermore, memory 1302 may store additional modules and data structures not described above.

Figure 14:
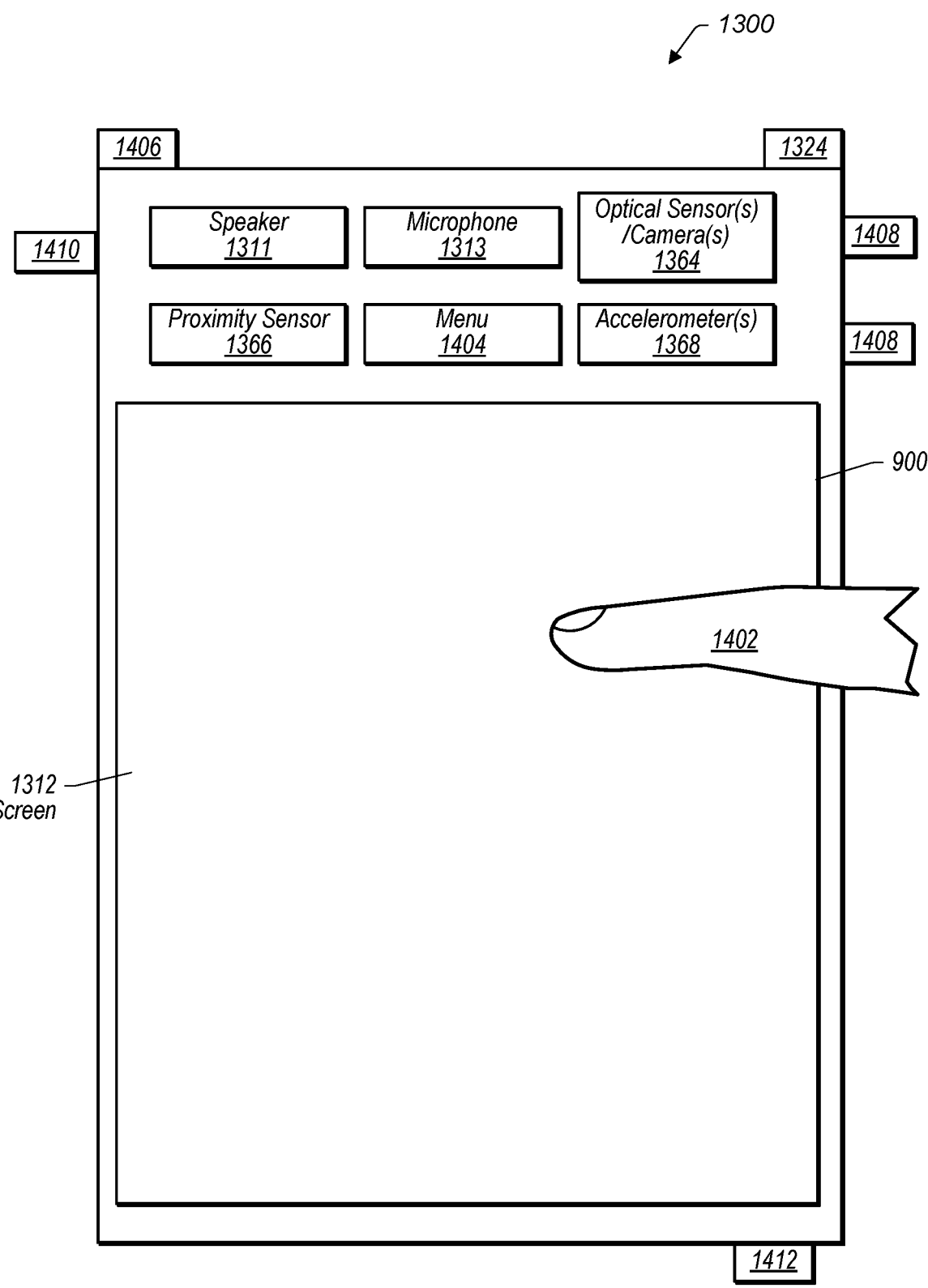
FIG. 14 depicts a portable multifunction device that may include a camera, in accordance with some embodiments.

FIG. 14 depicts illustrates an example portable multifunction device 1300 that may include a camera, in accordance with some embodiments. In some embodiments, the portable multifunction device 1300 may include one or multiple features, components, and/or functionality of embodiments described herein with reference to FIGS. 1A-13 and 15.

The device 1300 may have a touch screen 1312. The touch screen 1312 may display one or more graphics within user interface (UI) 1400. In this embodiment, as well as others described below, a user may select one or more of the graphics by making a gesture on the graphics, for example, with one or more fingers 1402 (not drawn to scale in the figure) or one or more styluses 1403 (not drawn to scale in the figure).

Device 1300 may also include one or more physical buttons, such as "home" or menu button 1404. As described previously, menu button 1404 may be used to navigate to any application 1336 in a set of applications that may be executed on device 1300. Alternatively, in some embodiments, the menu button 1404 is implemented as a soft key in a GUI displayed on touch screen 1312.

In one embodiment, device 1300 includes touch screen 1312, menu button 1404, push button 1406 for powering the device on/off and locking the device, volume adjustment button(s) 1408, Subscriber Identity Module (SIM) card slot 1410, head set jack 1412, and docking/charging external port 1324. Push button 1406 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 1300 also may accept verbal input for activation or deactivation of some functions through microphone 1313.

It should be noted that, although many of the examples herein are given with reference to optical sensor(s)/camera(s) 1364 (on the front of a device), one or more rear-facing cameras or optical sensors that are pointed opposite from the display may be used instead of, or in addition to, an optical sensor(s)/camera(s) 1364 on the front of a device. At least one, several, or all cameras 1364 may include one or multiple features, components, and/or functionality of embodiments described herein with reference to FIGS. 1A-12D, 13, and 15

Figure 15:
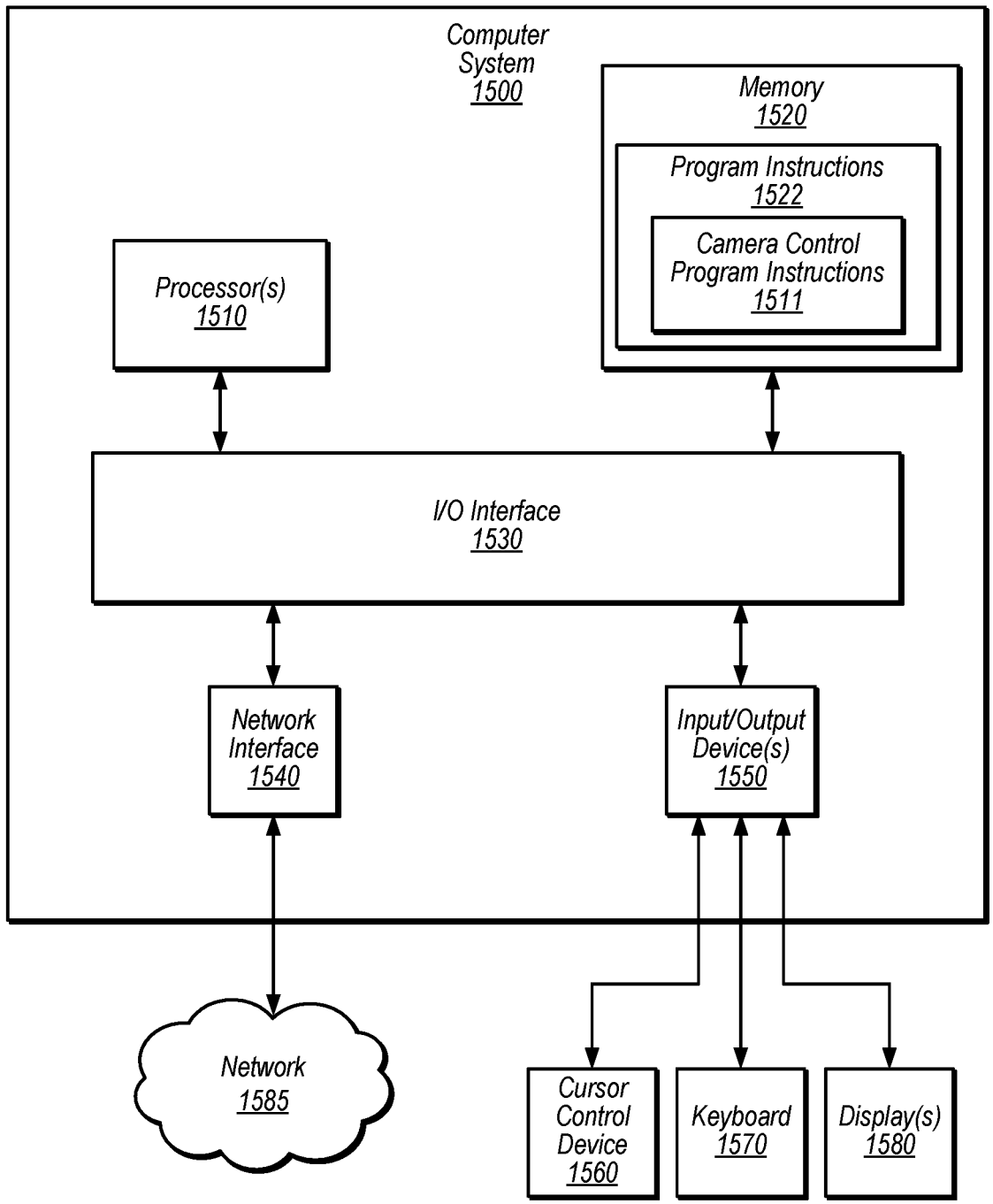
FIG. 15 illustrates an example computer system that may include a camera, in accordance with some embodiments.

FIG. 15 illustrates an example computer system 1500 that may include one or more cameras, in accordance with some embodiments. At least one, several, or all cameras of computer system 1500 may include one or multiple features, components, and/or functionality of embodiments described herein with reference to FIGS. 1A-14. In some embodiments, the computer system 1500 may include one or multiple features, components, and/or functionality of embodiments described herein with reference to FIGS. 1A-14.

The computer system 1500 may be configured to execute any or all of the embodiments described above. In different embodiments, computer system 1500 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

Various embodiments of a camera motion control system as described herein, including embodiments of magnetic position sensing, as described herein may be executed in one or more computer systems 1500, which may interact with various other devices. Note that any component, action, or functionality described above with respect to FIGS. 1-14 may be implemented on one or more computers configured as computer system 1500 of FIG. 15, according to various embodiments. In the illustrated embodiment, computer system 1500 includes one or more processors 1510 coupled to a system memory 1520 via an input/output (I/O) interface 1530. Computer system 1500 further includes a network interface 1540 coupled to I/O interface 1530, and one or more input/output devices 1550, such as cursor control device 1560, keyboard 1570, and display(s) 1580. In some cases, it is contemplated that embodiments may be implemented using a single instance of computer system 1500, while in other embodiments multiple such systems, or multiple nodes making up computer system 1500, may be configured to host different portions or instances of embodiments. For example, in one embodiment some elements may be implemented via one or more nodes of computer system 1500 that are distinct from those nodes implementing other elements.

In various embodiments, computer system 1500 may be a uniprocessor system including one processor 1510, or a multiprocessor system including several processors 1510 (e.g., two, four, eight, or another suitable number). Processors 1510 may be any suitable processor capable of executing instructions. For example, in various embodiments processors 1510 may be general-purpose or embedded processors implementing any of a variety of instruction set architectures (ISAs), such as the x86, PowerPC, SPARC, or MIPS ISAs, or any other suitable ISA. In multiprocessor systems, each of processors 1510 may commonly, but not necessarily, implement the same ISA.

System memory 1520 may be configured to store camera control program instructions 1522 and/or camera control data accessible by processor 1510. In various embodiments, system memory 1520 may be implemented using any suitable memory technology, such as static random access memory (SRAM), synchronous dynamic RAM (SDRAM), nonvolatile/Flash-type memory, or any other type of memory. In the illustrated embodiment, program instructions 1522 may be configured to implement a lens control application 1524 incorporating any of the functionality described above. Additionally, existing camera control data 1532 of memory 1520 may include any of the information or data structures described above. In some embodiments, program instructions and/or data may be received, sent or stored upon different types of computer-accessible media or on similar media separate from system memory 1520 or computer system 1500. While computer system 1500 is described as implementing the functionality of functional blocks of previous Figures, any of the functionality described herein may be implemented via such a computer system.

In one embodiment, I/O interface 1530 may be configured to coordinate I/O traffic between processor 1510, system memory 1520, and any peripheral devices in the device, including network interface 1540 or other peripheral interfaces, such as input/output devices 1550. In some embodiments, I/O interface 1530 may perform any necessary protocol, timing or other data transformations to convert data signals from one component (e.g., system memory 1520) into a format suitable for use by another component (e.g., processor 1510). In some embodiments, I/O interface 1530 may include support for devices attached through various types of peripheral buses, such as a variant of the Peripheral Component Interconnect (PCI) bus standard or the Universal Serial Bus (USB) standard, for example. In some embodiments, the function of I/O interface 1530 may be split into two or more separate components, such as a north bridge and a south bridge, for example. Also, in some embodiments some or all of the functionality of I/O interface 1530, such as an interface to system memory 1520, may be incorporated directly into processor 1510.

Network interface 1540 may be configured to allow data to be exchanged between computer system 1500 and other devices attached to a network 1585 (e.g., carrier or agent devices) or between nodes of computer system 1500. Network 1585 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1540 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1550 may, in some embodiments, include one or more display terminals, keyboards, keypads, touchpads, scanning devices, voice or optical recognition devices, or any other devices suitable for entering or accessing data by one or more computer systems 1500. Multiple input/output devices 1550 may be present in computer system 1500 or may be distributed on various nodes of computer system 1500. In some embodiments, similar input/output devices may be separate from computer system 1500 and may interact with one or more nodes of computer system 1500 through a wired or wireless connection, such as over network interface 1540.

As shown in FIG. 15, memory 1520 may include program instructions 1522, which may be processor-executable to implement any element or action described above. In one embodiment, the program instructions may implement the methods described above. In other embodiments, different elements and data may be included. Note that data may include any data or information described above.

Those skilled in the art will appreciate that computer system 1500 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 1500 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1500 may be transmitted to computer system 1500 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The following clauses further describe various embodiments that may include various features as described above and/or illustrated in the Figures:

Clause 1. A coil structure, comprising:

a base portion that includes an autofocus (AF) coil to provide AF to a camera; and
tab portions that extend from the base portion, wherein each of the tab portions includes:
  a respective optical image stabilization (OIS) coil to provide OIS to the camera; and
  a respective fold portion between the base portion and the respective OIS coil, wherein the coil structure is folded at the respective fold portion to orient the respective OIS coil at an angle relative to the AF coil.

Clause 2. The coil structure of clause 1, wherein:
the AF coil defines a first plane;
the respective OIS coil defines a second plane; and
the first plane is orthogonal to the second plane.

Clause 3. The coil structure of clause 1, wherein the AF coil is sized to surround an image sensor of the camera.

Clause 4. The coil structure of clause 1, wherein coil structure is formed of a flex circuit.

Clause 5. The coil structure of clause 1, further comprising:
a substrate;
wherein the AF coil and the respective OIS coil are formed on the substrate via an additive deposition process.

Clause 6. A voice coil motor (VCM) actuator to shift an image sensor of a camera along multiple axis, the VCM actuator comprising:
a magnet;
a plurality of coils;
  a substrate to couple with an image sensor of a camera such that the image sensor moves together with the substrate;
  a top flexure to guide motion of the substrate in a controlled manner, wherein the top flexure comprises:
    a leaf portion; and
    a wire portion, comprising:
      a top end attached to the leaf portion; and
      a bottom end attached to a first stationary component of the camera.

Clause 7. The VCM actuator of clause 6, further comprising:
a bottom flexure to guide motion of the substrate in a controlled manner;
wherein the bottom flexure comprises:
  a movable platform attached to the substrate;
  a stationary platform attached to the first stationary component or a second stationary component of the camera; and
  one or more flexure arms that connect the movable platform to the stationary platform.

Clause 8. The VCM actuator of clause 6, wherein the leaf portion is formed of an etched sheet.

Clause 9. The VCM actuator of clause 8, wherein the leaf portion comprises:
outer corner portions; and
an inner ring portion attached to a movable component of the camera.

Clause 10. The VCM actuator of clause 9, wherein the top end of the wire portion is attached to at least one of the outer corner portions.

Clause 11. The VCM actuator of clause 9, wherein the inner ring portion is attached to a coil carrier of the camera, and wherein the coil carrier holds the plurality of coils.

Clause 12. The VCM actuator of clause 6, wherein the magnet and the plurality of coils are configured to magnetically interact to:
move the image sensor in a plurality of directions orthogonal to an optical axis of the camera; and
move the image sensor along the optical axis.

Clause 13. The VCM actuator of clause 7, wherein:
the bottom flexure extends along a first plane that is orthogonal to an optical axis of the camera;
the leaf portion of the top flexure extends along a second plane that is orthogonal to the optical axis; and
the first plane is closer to the image sensor than the second plane.

Clause 14. The VCM actuator of clause 6, wherein:
the plurality of coils include an autofocus (AF) coil and optical image stabilization (OIS) coils; and
the VCM actuator further comprises:
  a coil structure, including:
    a base portion that includes the AF coil; and
    tab portions that extend from the base portion, wherein each of the tab portions includes:
      a respective OIS coil of the OIS coils; and
      a respective fold portion between the base portion and the respective OIS coil, wherein the coil structure is folded at the respective fold portion to orient the respective OIS coil to be orthogonal to the AF coil.

Clause 15. The VCM actuator of clause 14, wherein:
the coil structure further comprises a first position sensor mounting portion and a second position sensor mounting portion; and
the first position sensor mounting portion extends from a first OIS coil of the OIS coils such that a first position sensor mounted to the first position sensor mounting portion is capable of sensing OIS movement in a first direction; and
the second position sensor mounting portion extends from a second OIS coil of the OIS coils such that a second position sensor mounted to the second position sensor mounting portion is capable of sensing OIS movement in a second direction that is orthogonal to the first direction.

Clause 16. A camera, comprising:
a lens comprising one or more lens elements;
an image sensor configured to capture light passing through the lens and convert the captured light into image signals;
a voice coil motor (VCM) actuator, comprising:
  magnets; and
  a coil structure, including:
    a bottom autofocus (AF) coil to shift the image sensor along an optical axis of the camera to provide AF, wherein the bottom AF coil is located below the magnets; and
    optical image stabilization (OIS) coils to shift the image sensor in directions orthogonal to the optical axis to provide OIS, wherein each of the OIS coils is located proximate a respective magnet of the magnets, and wherein the OIS coils are orthogonal to the bottom AF coil.

Clause 17. The camera of clause 16, wherein:
the magnets are stationary; and
the coil structure is movable relative to the magnets.

Clause 18. The camera of clause 16, wherein each of the magnets is a corner magnet that is located proximate a respective corner of the camera.

Clause 19. The camera of clause 16, wherein each of the magnets is a side magnet that is located proximate a respective side of the camera.

Clause 20. The camera of clause 16, further comprising a top AF coil to shift the image sensor along the optical axis to provide AF, wherein the top AF coil is located above the magnets.

Clause 21. The camera of clause 16, wherein the bottom AF coil is sized to form a first periphery that is larger than a second periphery formed by the image sensor.

Clause 22. The camera of clause 16, wherein the VCM actuator further comprises:
a substrate coupled to the image sensor such that the image sensor moves together with the substrate; and
a top flexure to guide motion of the substrate in a controlled manner, wherein the top flexure comprises:
a leaf portion; and
a wire portion, comprising:
a top end attached to the leaf portion; and
a bottom end attached to a stationary component of the camera.

Clause 23. The camera of clause 16, wherein the VCM actuator further comprises:
a substrate coupled to the image sensor such that the image sensor moves together with the substrate; and
a bottom flexure to guide motion of the substrate in a controlled manner;
wherein the bottom flexure comprises:
a movable platform attached to the substrate;
a stationary platform attached to a stationary component of the camera; and
one or more flexure arms that connect the movable platform to the stationary platform.

Clause 24. The camera of clause 16, wherein the VCM actuator further includes:
a substrate coupled to the image sensor such that the image sensor moves together with the substrate;
a top flexure to guide motion of the substrate in a controlled manner, wherein the top flexure comprises:
a leaf portion; and
a wire portion, comprising:
a top end attached to the leaf portion; and
a bottom end attached to a first stationary component of the camera; and
a bottom flexure to guide motion of the substrate in a controlled manner, wherein the bottom flexure comprises:
a movable platform attached to the substrate;
a stationary platform attached to the first stationary component or a second stationary component of the camera; and
one or more flexure arms that connect the movable platform to the stationary platform.

Clause 25. The camera of clause 16, wherein:
the magnets include four magnets;
the OIS coils include four OIS coils; and
each of the four OIS coils is located proximate a respective one of the four OIS coils.

Clause 26. The camera of clause 16, further comprising:
a coil carrier to hold the coil structure;
wherein:
the coil carrier includes at least two windows; and
each of the at least two windows is sized to accommodate at least a portion of a respective position sensor of the camera.

Clause 27. The camera of clause 16, further comprising:
a first position sensor disposed proximate a first OIS coil of the OIS coils; and
a second position sensor disposed proximate a second OIS coil of the OIS coils.

Clause 28. The camera of clause 27, wherein:
the first OIS coil is part of a first pair of opposing OIS coils that contribute to OIS movement in a first direction;
the first position sensor is positioned to sense the OIS movement in the first direction;
the second OIS coil is part of a second pair of opposing OIS coils that contribute to OIS movement in a second direction that is orthogonal to the first direction; and
the second position sensor is positioned to sense the OIS movement in the second direction.

Clause 29. The camera of clause 28, wherein the first position sensor and the second position sensor are positioned to sense AF movement.

Clause 30. The camera of clause 27, wherein the first position sensor is a Hall sensor, a GMR sensor, or a TMR sensor.

Clause 31. A mobile device, comprising:
a camera module, including:
a lens comprising one or more lens elements;
an image sensor configured to capture light passing through the lens and covert the captured light into image signals;
magnets;
an autofocus (AF) coil that magnetically interacts with the magnets to shift the image sensor along an optical axis of the camera module; and
optical image stabilization (OIS) coils that magnetically interact with the magnets to shift the image sensor in directions orthogonal to the optical axis;
a first position sensor located proximate a first magnet of the magnets, wherein the first position sensor is positioned to sense at least one of:
OIS movement based on a first magnetic field component produced by the first magnet in a first direction that is orthogonal to the optical axis; or
AF movement based on the first magnetic field component and a second magnetic field component produced by the first magnet in a second direction that is orthogonal to the first direction;
a display; and
one or more processors configured to:
determine a first position of the image sensor based at least in part on at least one of the OIS movement or the AF movement sensed by the first position sensor;
cause the VCM actuator to move the image sensor, relative to an optical axis of the camera module, to a second position; and
cause the camera module to capture an image while the image sensor is at the second position; and
cause the display to present the image.

Clause 32. The mobile device of clause 31, wherein the camera module further comprises:
a second position sensor located proximate a second magnet of the magnets, wherein the second position sensor is positioned to sense at least one of:
OIS movement based on a third magnetic field component produced by the second magnet in a third direction that is orthogonal to the optical axis and the first direction; or
AF movement based on the third magnetic field component and a fourth magnetic field component produced by the second magnet in a fourth direction that is orthogonal to the third direction.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A camera, comprising:
a lens comprising one or more lens elements;
an image sensor configured to capture light passing through the lens and convert the captured light into image signals;
a voice coil motor (VCM) actuator, comprising:
 magnets; and
 a coil structure, comprising:
  a base portion that comprises an autofocus (AF) coil to provide AF to a camera; and
  tab portions that extend from the base portion, wherein each of the tab portions comprises:
   a respective optical image stabilization (OIS) coil to provide OIS to the camera; and
   a respective fold portion between the base portion and the respective OIS coil, wherein the coil structure is folded at the respective fold portion to orient the respective OIS coil at an angle relative to the AF coil.

2. The camera of claim 1, wherein:
the AF coil defines a first plane;
the respective OIS coil defines a second plane; and
the first plane is orthogonal to the second plane.

3. The camera of claim 1, wherein the AF coil is sized to surround the image sensor.

4. The camera of claim 1, wherein coil structure is formed of a flex circuit.

5. The camera of claim 1, further comprising:
a substrate;
wherein the AF coil and the respective OIS coil are formed on the substrate via an additive deposition process.

6. The camera of claim 1, wherein:
the AF coil is configured to shift the image sensor along an optical axis of the camera to provide AF, wherein the AF coil is located below, above, or both below and above the magnets; and
the respective OIS coils are configured to shift the image sensor in directions orthogonal to the optical axis to provide OIS, wherein each of the OIS coils is located proximate a respective magnet of the magnets, and wherein the OIS coils are orthogonal to the AF coil.

7. The camera of claim 1, wherein:
the magnets are stationary; and
the coil structure is movable relative to the magnets.

8. The camera of claim 1, wherein each of the magnets is a corner magnet that is located proximate a respective corner of the camera.

9. The camera of claim 1, wherein each of the magnets is a side magnet that is located proximate a respective side of the camera.

10. The camera of claim 1, wherein the AF coil is located below the magnets, the camera further comprising a top AF coil to assist in shifting the image sensor along the optical axis to provide AF, wherein the top AF coil is located above the magnets.

11. The camera of claim 1, further comprising:
a bottom flexure to guide motion of the image sensor and coil structure together in a controlled manner;
wherein the bottom flexure comprises:
 a movable platform attached to the image sensor and coil structure;
 a stationary platform attached to a stationary component of the camera; and
 one or more flexure arms that connect the movable platform to the stationary platform.

12. The camera of claim 11, further comprising a top flexure comprising:
a leaf portion attached to the coil structure; and
a wire portion extending from the leaf portion to the stationary component,
wherein the leaf portion extends above the bottom flexure to assist in suspending and guiding the coil structure.

13. The camera of claim 12, wherein:
the bottom flexure extends along a first plane that is orthogonal to an optical axis of the camera;
the leaf portion of the top flexure extends along a second plane that is orthogonal to the optical axis; and
the first plane is closer to the image sensor than the second plane.

14. The camera of claim 1, wherein:
the magnets include four magnets;
the OIS coils include four OIS coils; and
each of the four OIS coils is located proximate a respective one of the four magnets.

15. The camera of claim 1, further comprising:
a coil carrier to hold the coil structure;
wherein:
 the coil carrier includes at least two windows; and
 each of the at least two windows is sized to accommodate at least a portion of a respective position sensor of the camera.

16. The camera of claim 1, further comprising:
a first position sensor disposed proximate a first OIS coil of the OIS coils; and
a second position sensor disposed proximate a second OIS coil of the OIS coils, wherein:
 the first OIS coil is part of a first pair of opposing OIS coils that contribute to OIS movement in a first direction;
 the first position sensor is positioned to sense the OIS movement in the first direction;
 the second OIS coil is part of a second pair of opposing OIS coils that contribute to OIS movement in a second direction that is orthogonal to the first direction; and
 the second position sensor is positioned to sense the OIS movement in the second direction.

17. The camera of claim 16, wherein the first position sensor and the second position sensor are positioned to sense AF movement.

18. The camera of claim 16, wherein the first position sensor is a Hall sensor, a GMR sensor, or a TMR sensor.

19. A coil structure, comprising:
- a base portion that comprises an autofocus (AF) coil to provide AF to a camera; and
- tab portions that extend from the base portion, wherein each of the tab portions comprises:
  - a respective optical image stabilization (OIS) coil to provide OIS to the camera; and
  - a respective fold portion between the base portion and the respective OIS coil, wherein the coil structure is folded at the respective fold portion to orient the respective OIS coil at an angle relative to the AF coil.

20. A device, comprising:
- a display;
- a camera, comprising:
  - a lens comprising one or more lens elements;
  - an image sensor configured to capture light passing through the lens and convert the captured light into image signals;
  - a voice coil motor (VCM) actuator, comprising:
    - magnets; and
    - a coil structure, comprising:
      - a base portion that comprises an autofocus (AF) coil to provide AF to a camera; and
      - tab portions that extend from the base portion, wherein each of the tab portions comprises:
        - a respective optical image stabilization (OIS) coil to provide OIS to the camera; and
        - a respective fold portion between the base portion and the respective OIS coil, wherein the coil structure is folded at the respective fold portion to orient the respective OIS coil at an angle relative to the AF coil; and
- a processor configured to cause an image based on the image signals from the image sensor to be displayed on the display.

* * * * *